(12) United States Patent
Sakhnini et al.

(10) Patent No.: US 11,871,438 B2
(45) Date of Patent: Jan. 9, 2024

(54) TIME DOMAIN SYNCHRONIZATION SIGNAL BLOCK AND CONTROL RESOURCE SET MULTIPLEXING

(71) Applicant: QUALCOMM Incorporated, San Diego, CA (US)

(72) Inventors: Iyab Issam Sakhnini, San Diego, CA (US); Tao Luo, San Diego, CA (US); Xiaoxia Zhang, San Diego, CA (US); Jun Ma, San Diego, CA (US); Jing Sun, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 17/161,178

(22) Filed: Jan. 28, 2021

(65) Prior Publication Data
US 2022/0240253 A1    Jul. 28, 2022

(51) Int. Cl.
| H04W 4/00 | (2018.01) |
| H04W 72/53 | (2023.01) |
| H04L 27/26 | (2006.01) |
| H04W 56/00 | (2009.01) |
| H04W 72/0446 | (2023.01) |
| H04W 72/23 | (2023.01) |

(52) U.S. Cl.
CPC ....... *H04W 72/53* (2023.01); *H04L 27/26025* (2021.01); *H04W 56/001* (2013.01); *H04W 72/0446* (2013.01); *H04W 72/23* (2023.01)

(58) Field of Classification Search
None
See application file for complete search history.

(56) References Cited

U.S. PATENT DOCUMENTS

| 2018/0295590 A1* | 10/2018 | Abedini | H04L 5/0051 |
| 2019/0357292 A1* | 11/2019 | Cirik | H04W 24/08 |
| 2020/0120624 A1* | 4/2020 | Lin | H04W 72/23 |
| 2021/0176755 A1* | 6/2021 | Liu | H04W 72/005 |

(Continued)

FOREIGN PATENT DOCUMENTS

WO    WO-2019104672 A1    6/2019

OTHER PUBLICATIONS

International Search Report and Written Opinion—PCT/US2022/070074—ISA/EPO—dated May 13, 2022.

(Continued)

*Primary Examiner* — Zewdu A Beyen
(74) *Attorney, Agent, or Firm* — Holland & Hart LLP/QUALCOMM Incorporated

(57) ABSTRACT

Methods, systems, and devices for wireless communications are described. A user equipment (UE) may receive control signaling from a base station including a resource configuration indicating a resource block includes a synchronization signal block (SSB) and a control resource set (CORESET). The resource configuration may be based on a sub-carrier spacing (SCS) configuration. The UE may receive the SSB and the CORESET from the base station within the resource block and according to the resource configuration. The UE may receive one or more reference signals and may decode the SSB and the CORESET based on the resource configuration and the reference signals.

43 Claims, 19 Drawing Sheets

(56) References Cited

U.S. PATENT DOCUMENTS

2022/0046552 A1* 2/2022 Xu .................. H04W 74/004
2022/0046613 A1* 2/2022 Lee .................. H04L 5/0053

OTHER PUBLICATIONS

Moderator (Intel Corporation): "[103-e-NR-52-71-Waveform-Changes] Discussions Summary #5", 3GPP Draft, 3GPP TSG RAN WG1 Meeting #103-e, R1-2009717, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 13, 2020 (Nov. 13, 2020), XP051954366, 199 Pages, Retrieved from the Internet: URL: https://ftp.3gpp.org/tsg_ran/WG1_RL1/TSGR1_103-e/Docs/R1-2009717.zip_R1-2009717_NR_60ghz_email_discussion-1-v212.docx [Retrieved on Nov. 13, 2020] pp. 25-84.

* cited by examiner

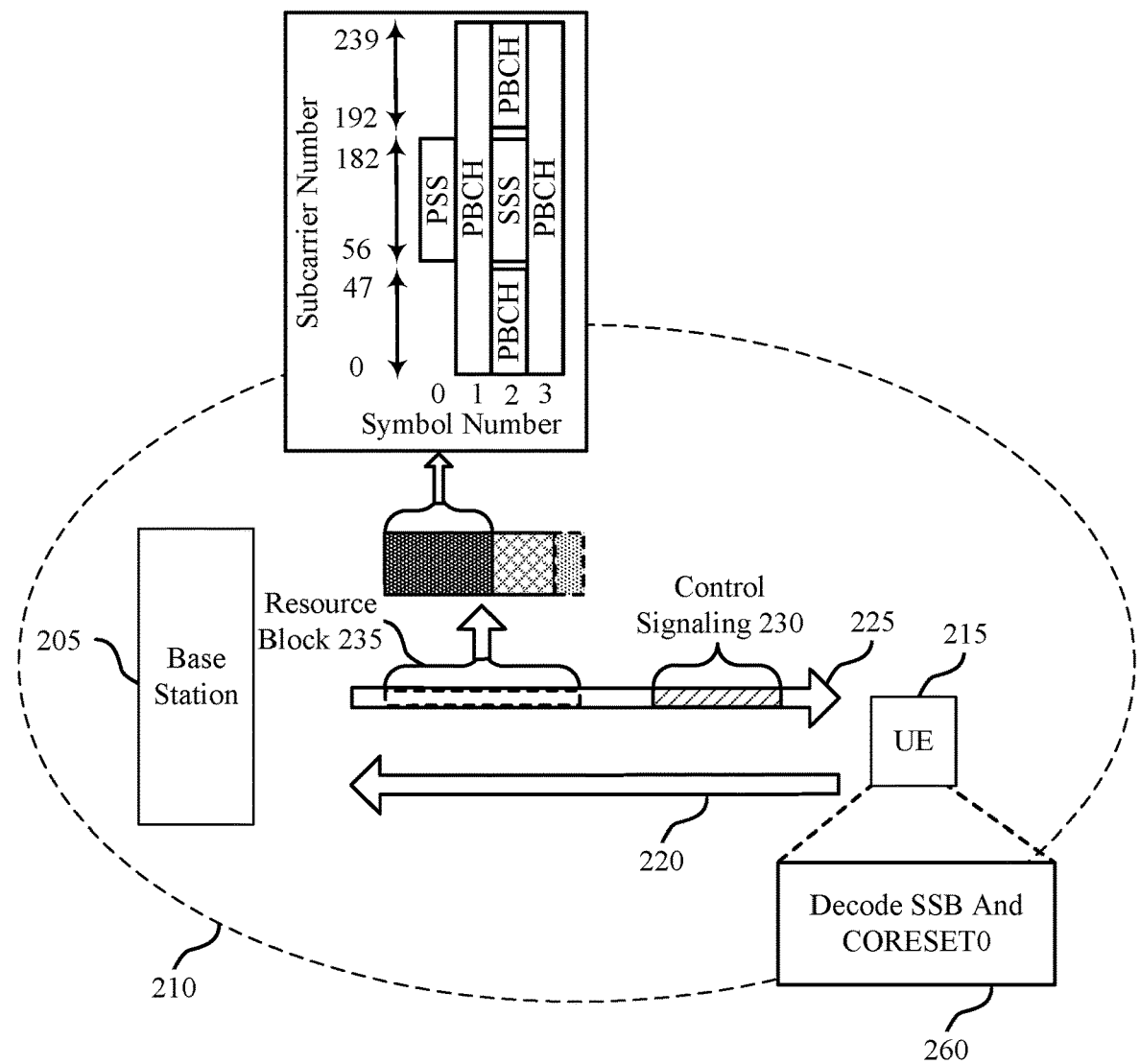
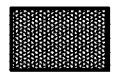 SSB 240
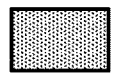 Beam Switching Gap 250
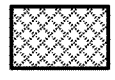 CORESET0 245
 Resource Configuration 255
FIG. 2

Multiplexing Pattern 1
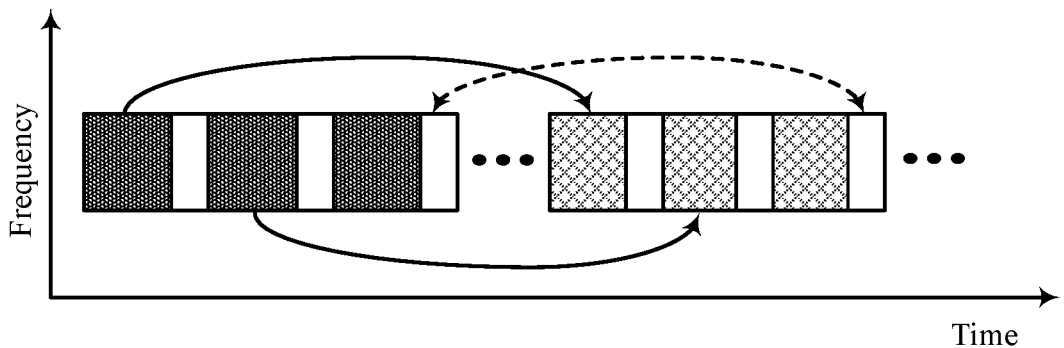
FIG. 3A
Multiplexing Pattern 2
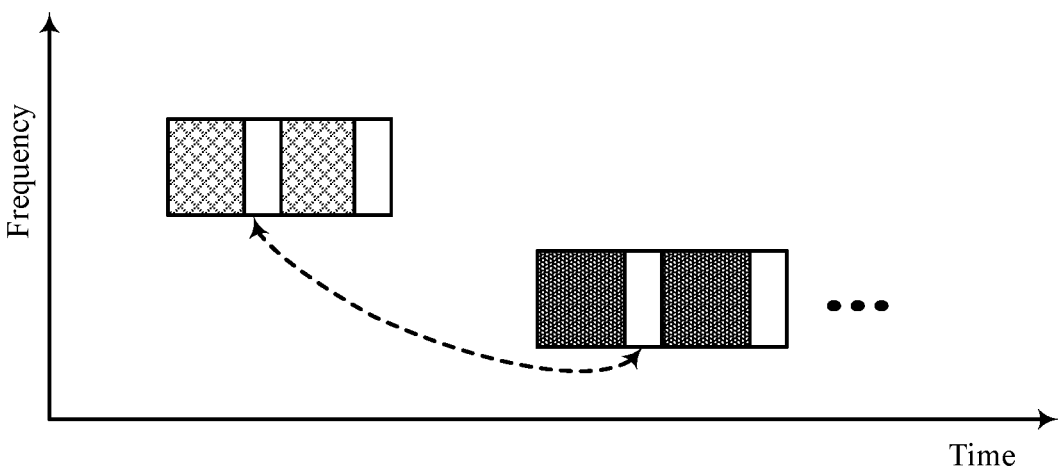
FIG. 3B
 SSB 305
 CORESET0 310
 Beam Switching Gap 315

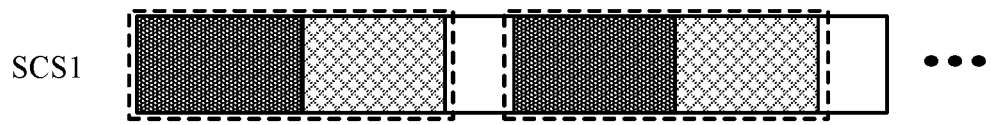
FIG. 4A
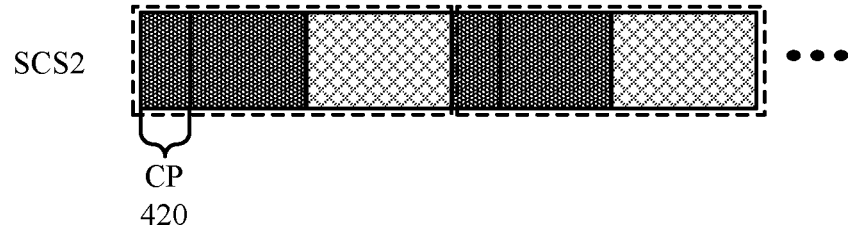
FIG. 4B
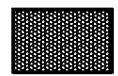 SSB 405
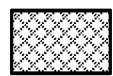 CORESET0 410
 Beam Switching Gap 415

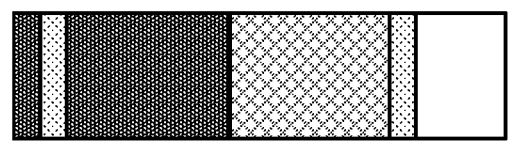
FIG. 5A  500-a
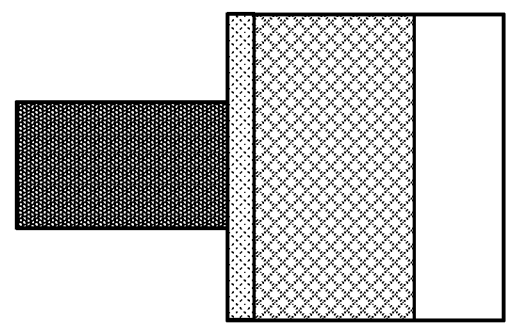
FIG. 5B  500-b
| | | | |
|---|---|---|---|
|  | SSB 505 | 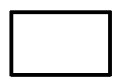 | Beam Switching Gap 515 |
|  | CORESET0 510 |  | Shared Reference Signal 520 |

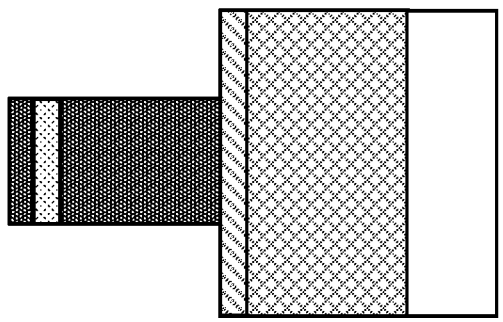
|  | SSB 605 |  | SSB Reference Signal 620 |
| --- | --- | --- | --- |
|  | CORESET0 610 |  | CORESET0 Reference Signal 625 |
| 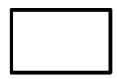 | Beam Switching Gap 615 | | |
600
FIG. 6

TIME DOMAIN SYNCHRONIZATION SIGNAL BLOCK AND CONTROL RESOURCE SET MULTIPLEXING

INTRODUCTION

The following relates to wireless communications, and more specifically to resource management based on subcarrier spacing (SCS).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a UE is described. The method may include receiving a resource configuration for a resource block including a synchronization signal block (SSB) and a control resource set (CORESET), the resource configuration associated with an SCS configuration and the resource block associated with a frequency band of a base station, receiving, within the resource block and based on the resource configuration, the SSB and the CORESET, and decoding the SSB and the CORESET.

An apparatus for wireless communications at a UE is described. The apparatus may include a processor and memory coupled with the processor. The possessor and memory may be configured to receive a resource configuration for a resource block including an SSB and a CORESET, the resource configuration associated with an SCS configuration and the resource block associated with a frequency band of a base station, receive, within the resource block and based on the resource configuration, the SSB and the CORESET, and decode the SSB and the CORESET.

Another apparatus for wireless communications at a UE is described. The apparatus may include means for receiving a resource configuration for a resource block including an SSB and a CORESET, the resource configuration associated with an SCS configuration and the resource block associated with a frequency band of a base station, means for receiving, within the resource block and based on the resource configuration, the SSB and the CORESET, and means for decoding the SSB and the CORESET.

A non-transitory computer-readable medium storing code for wireless communications at a UE is described. The code may include instructions executable by a processor to receive a resource configuration for a resource block including an SSB and a CORESET, the resource configuration associated with an SCS configuration and the resource block associated with a frequency band of a base station, receive, within the resource block and based on the resource configuration, the SSB and the CORESET, and decode the SSB and the CORESET.

Some examples of the method, apparatuses, and non-transitory computer-readable medium described herein may further include operations, features, means, or instructions for receiving a first reference signal for the SSB and a second reference signal for the CORESET, the first reference signal being the same as the second reference signal.

In some examples of the method, apparatuses, and non-transitory computer-readable medium described herein, the SSB includes a first bandwidth and the CORESET includes a second bandwidth, the first bandwidth being the same as the second bandwidth.

Some examples of the method, apparatuses, and non-transitory computer-readable medium described herein may further include operations, features, means, or instructions for receiving a master information block (MIB) including an indication of one or more frequency resources, a bandwidth, a time duration, or a combination thereof associated with the CORESET.

In some examples of the method, apparatuses, and non-transitory computer-readable medium described herein, the SSB includes a first bandwidth and the CORESET includes a second bandwidth, the first bandwidth being different from the second bandwidth.

Some examples of the method, apparatuses, and non-transitory computer-readable medium described herein may further include operations, features, means, or instructions for receiving an indication of a number of resources associated with a beam switching gap, the number of resources corresponding to the SCS configuration and performing a beam switching operation during the number of resources based on decoding the SSB and the CORESET.

Some examples of the method, apparatuses, and non-transitory computer-readable medium described herein may further include operations, features, means, or instructions for performing the beam switching operation during a cyclic prefix associated with the SSB based on a size of the cyclic prefix satisfying a threshold value.

Some examples of the method, apparatuses, and non-transitory computer-readable medium described herein may further include operations, features, means, or instructions for selecting one of a first bandwidth or a second bandwidth for receiving a reference signal for the SSB and the CORESET based on the SSB corresponding to the first bandwidth and the CORESET corresponding to the second bandwidth.

Some examples of the method, apparatuses, and non-transitory computer-readable medium described herein may further include operations, features, means, or instructions for selecting the first bandwidth based on the first bandwidth being greater than the second bandwidth.

Some examples of the method, apparatuses, and non-transitory computer-readable medium described herein may further include operations, features, means, or instructions for performing a channel estimation procedure to determine the first bandwidth and the second bandwidth, where the second bandwidth may be a fixed bandwidth, the UE blindly selects the second bandwidth, the second bandwidth may be indicated in a synchronization signal, the second bandwidth may be a portion of bandwidth that overlaps with the SSB, or a combination thereof.

Some examples of the method, apparatuses, and non-transitory computer-readable medium described herein may further include operations, features, means, or instructions for performing a channel estimation procedure based on a first reference signal, the first reference signal different from a second reference signal associated with the SSB.

In some examples of the method, apparatuses, and non-transitory computer-readable medium described herein, the SSB may be associated with a first waveform and the CORESET may be associated with a second waveform, the first waveform being different from the second waveform.

In some examples of the method, apparatuses, and non-transitory computer-readable medium described herein, the SSB may be associated with a first waveform and the CORESET may be associated with a second waveform, the first waveform being the same as the second waveform.

In some examples of the method, apparatuses, and non-transitory computer-readable medium described herein, the SSB and the CORESET correspond to a broadcast channel.

A method for wireless communications at a base station is described. The method may include encoding an SSB and a CORESET according to a resource configuration for a resource block including the SSB and the CORESET, the resource configuration associated with an SCS configuration and the resource block associated with a frequency band of the base station and transmitting, to a UE and within the resource block, the SSB and the CORESET based on the resource configuration.

An apparatus for wireless communications at a base station is described. The apparatus may include a processor and memory coupled with the processor. The possessor and memory may be configured to encode an SSB and a CORESET according to a resource configuration for a resource block including the SSB and the CORESET, the resource configuration associated with an SCS configuration and the resource block associated with a frequency band of the base station and transmit, to a UE and within the resource block, the SSB and the CORESET based on the resource configuration.

Another apparatus for wireless communications at a base station is described. The apparatus may include means for encoding an SSB and a CORESET according to a resource configuration for a resource block including the SSB and the CORESET, the resource configuration associated with an SCS configuration and the resource block associated with a frequency band of the base station and means for transmitting, to a UE and within the resource block, the SSB and the CORESET based on the resource configuration.

A non-transitory computer-readable medium storing code for wireless communications at a base station is described. The code may include instructions executable by a processor to encode an SSB and a CORESET according to a resource configuration for a resource block including the SSB and the CORESET, the resource configuration associated with an SCS configuration and the resource block associated with a frequency band of the base station and transmit, to a UE and within the resource block, the SSB and the CORESET based on the resource configuration.

Some examples of the method, apparatuses, and non-transitory computer-readable medium described herein may further include operations, features, means, or instructions for transmitting a first reference signal for the SSB and a second reference signal for the CORESET, the first reference signal being the same as the second reference signal.

In some examples of the method, apparatuses, and non-transitory computer-readable medium described herein, the SSB includes a first bandwidth and the CORESET includes a second bandwidth, the first bandwidth being the same as the second bandwidth.

Some examples of the method, apparatuses, and non-transitory computer-readable medium described herein may further include operations, features, means, or instructions for transmitting a MIB including an indication of one or more frequency resources, a bandwidth, a time duration, or a combination thereof associated with the CORESET.

In some examples of the method, apparatuses, and non-transitory computer-readable medium described herein, the SSB includes a first bandwidth and the CORESET includes a second bandwidth, the first bandwidth being different from the second bandwidth.

Some examples of the method, apparatuses, and non-transitory computer-readable medium described herein may further include operations, features, means, or instructions for transmitting, to the UE, an indication of the resource configuration including a number of resources associated with a beam switching gap, the number of resources corresponding to the SCS configuration.

Some examples of the method, apparatuses, and non-transitory computer-readable medium described herein may further include operations, features, means, or instructions for transmitting, to the UE, a synchronization signal including an indication of a bandwidth for receiving a reference signal for the SSB and the CORESET.

Some examples of the method, apparatuses, and non-transitory computer-readable medium described herein may further include operations, features, means, or instructions for transmitting a reference signal for the SSB and the CORESET based on the SSB corresponding to a first bandwidth and the CORESET corresponding to a second bandwidth.

Some examples of the method, apparatuses, and non-transitory computer-readable medium described herein may further include operations, features, means, or instructions for transmitting, to the UE, a synchronization signal including an indication of the second bandwidth.

Some examples of the method, apparatuses, and non-transitory computer-readable medium described herein may further include operations, features, means, or instructions for transmitting, to the UE, a first reference signal and a second reference signal associated with the SSB.

In some examples of the method, apparatuses, and non-transitory computer-readable medium described herein, the SSB may be associated with a first waveform and the CORESET may be associated with a second waveform, the first waveform being different from the second waveform.

In some examples of the method, apparatuses, and non-transitory computer-readable medium described herein, the SSB may be associated with a first waveform and the CORESET may be associated with a second waveform, the first waveform being the same as the second waveform.

In some examples of the method, apparatuses, and non-transitory computer-readable medium described herein, the SSB and the CORESET correspond to a broadcast channel.

BRIEF DESCRIPTION OF THE DRAWINGS

FIGS. 1 and 2 illustrate examples of wireless communications systems that support time domain SSB and CORESET multiplexing in accordance with one or more aspects of the present disclosure.

FIGS. 3A through 6 illustrate examples of resource diagrams that support time domain SSB and CORESET multiplexing in accordance with one or more aspects of the present disclosure.

DETAILED DESCRIPTION

Figure 1:
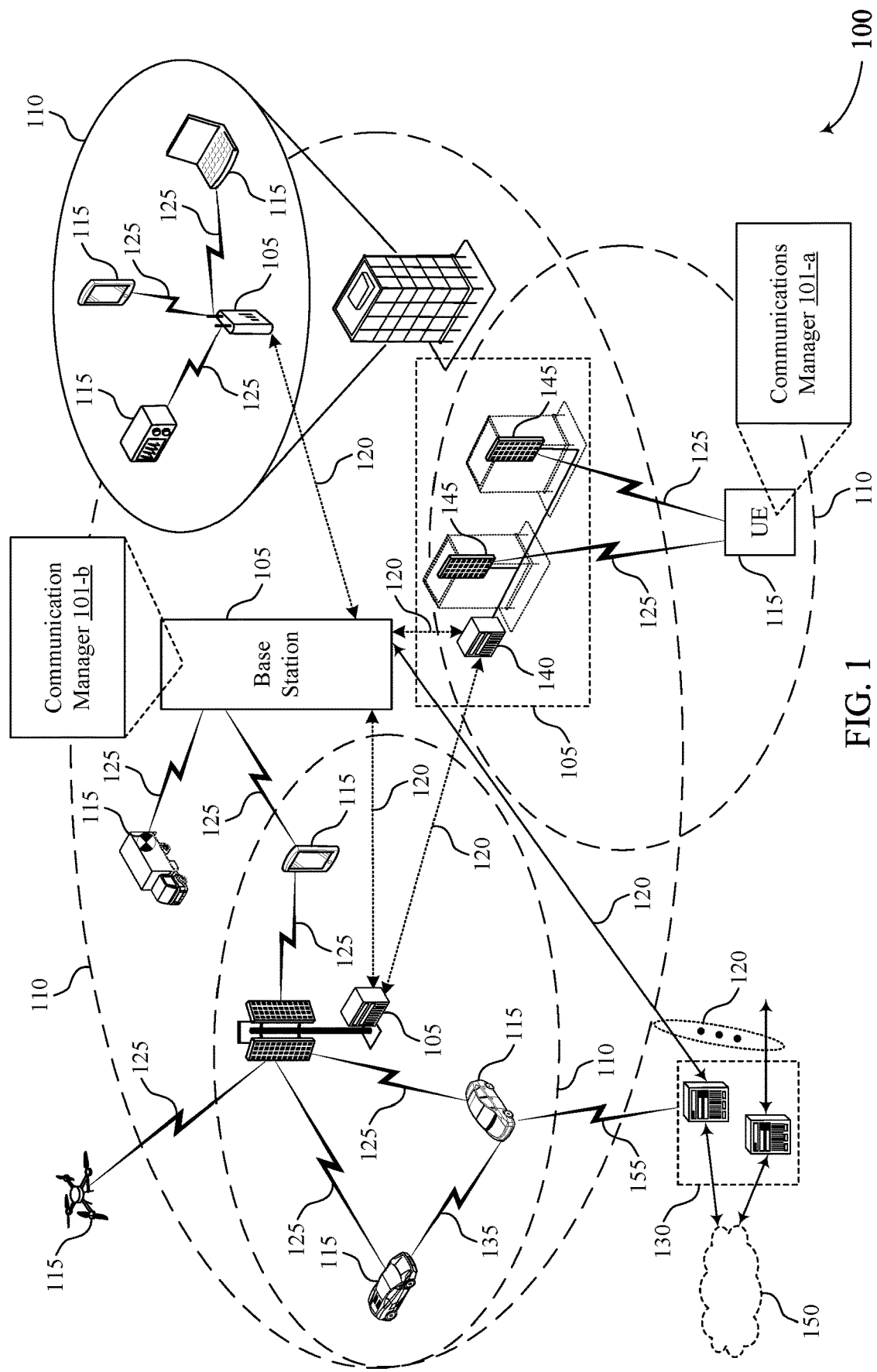

In some wireless communications systems, a UE may perform a synchronization and cell search procedure to initiate communications with a base station. For example, the UE may detect one or more synchronization signals in an SSB. The SSB may include a primary synchronization signal (PSS), a physical broadcast channel (PBCH), a secondary synchronization signal (SSS), or a combination thereof. During the cell search procedure, the UE may monitor for the synchronization signals based on one or more timing hypotheses and according to a SCS, which may be the width of one or more subcarriers in a frequency domain. In some examples, such as for higher frequency bands (e.g., frequency bands in a Frequency Range 2 (FR2)) that include millimeter wave (mmWave) range, the SCS may increase to reduce phase noise and to increase channel bandwidth. If the SCS increases, the symbol time and cyclic prefix length may decrease for a transmission, where the cyclic prefix may be a repetition of the last portion of a symbol included to reduce inter-symbol interference. Thus, the UE may implement beam switching gaps between consecutive SSB beams to facilitate a switching operation. However, the beam switching gap may be relatively large when compared with the symbols in the transmission, which may be an inefficient use of resources. Additionally, a CORESET, such as CORESET0, may be multiplexed according to a time division multiplexing (TDM) scheme with the SSB, which means the beam switching gap may exist between the SSB beams as well as the CORESET beams, which may further decrease the efficiency of resource utilization.

As described herein, a base station and UE may communicate signaling including a configuration in which the SSB and the CORESET for the SSB beam and the CORESET beam are grouped in a resource block (e.g., in a time domain). For example, a base station may transmit a configuration for an SCS that indicates the resource block including the SSB and the CORESET. The base station may transmit the SSB and the CORESET using the resource block, which may be followed by a beam switching gap. In some examples, the cyclic prefix may absorb the beam switching gap based on the SCS used for the transmission. In some cases, if the bandwidths of the SSB and the CORESET are the same, the UE may share the channel estimation reference signal for the CORESET (e.g., a demodulation reference signal (DMRS)) with the reference signal used for channel estimation for the PBCH in the SSB. In some other cases, if the bandwidths of the SSB and the CORESET are different, the UE may compare the bandwidth of the SSB channel and the CORESET channel and may select a shared reference signal bandwidth based on a wider bandwidth channel. In some examples, such as if there is no CORESET present, the UE may use a different reference signal for channel estimation than one or more reference signals associated with the SSB.

Aspects of the disclosure are initially described in the context of wireless communications systems. Aspects of the disclosure are further described in the context of resource diagrams and a process flow. Aspects of the disclosure are further illustrated by and described with reference to apparatus diagrams, system diagrams, and flowcharts that relate to time domain SSB and CORESET multiplexing.

FIG. 1 illustrates an example of a wireless communications system 100 that supports time domain SSB and CORESET multiplexing in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and SCS are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include an SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, which may be in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmWave communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, or the like. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 and a base station 105 may communicate using one or more time-frequency resources in a resource block, which may include a number of symbols (e.g., in time) and subcarriers (e.g., in frequency). The resource block may include one or more SSBs, which the UE 115 may use to support connection establishment with a base station or for beam switching, such as during an initial cell search. Placement of SSBs within the resource block may be based on the frequency band of the network and associated SCS. In some examples, the UE 115 may receive control information, such as downlink control information (DCI) with a format 1_0, including a grant for a system information block (SIB) (e.g., a SIB number 1 (SIB1)). The UE 215 may receive a DCI message using a CORESET of a downlink control channel (e.g., a physical downlink control channel (PDCCH)). In some cases, the SSB and the CORESET, such as a CORESET0, may be multiplexed for one or more frequency ranges (e.g., FR2). When the UE 115 performs a beam switching operation, the UE 115 may wait for a delay between consecutive SSB beams and CORESETs, which may be referred to as a beam switching gap, to facilitate a switching. However, for higher bands, which may have a higher SCS, as the symbols and the cyclic prefix become shorter, absorbing a beam switching gap in a cyclic prefix may not be possible. That is, a beam switching gap may be considerable in length compared to the symbol and may have a relatively large overhead and wasted resources.

In some examples, to reduce multiple beam switching gaps for an SSB and a CORESET, the UE 115 may group the SSB and the CORESET for each beam in the time domain in a single resource block. For example, the UE 115 may receive control signaling from a base station 105 including a resource configuration for the resource block. The resource configuration may indicate to the UE 115 that the resource block includes the SSB and the CORESET. Thus, the UE 115 may use a single beam switching gap for both the SSB and the CORESET. The resource configuration may include a number of symbols that make up the beam switching gap, which is described in further detail with respect to FIGS. 4A and 4B. In some other examples, the UE 115 may autonomously determine the resource configuration (e.g., based on the resource configuration being preconfigured or predetermined at the UE 115). The UE 115 may decode the SSB and the CORESET in the resource block. The UE 115 may perform a beam switching operation using the beam switching gap. In some examples, the UE 115 may communicate (e.g., data or control signaling) to the base station 105 based on performing the beam switching operation.

FIG. 2 illustrates an example of a wireless communications system 200 that supports time domain SSB and CORESET multiplexing in accordance with one or more aspects of the present disclosure. In some examples, wireless communications system 200 may implement aspects of wireless communication system 100 and may include base station 205 with coverage area 210 and UE 215, which may be examples of a base station 105 with a coverage area 110 and a UE 115 as described with reference to FIG. 1. In some examples, the UE 215 may communicate an uplink transmission with the base station 205 using an uplink communication link 220 or may receive a downlink transmission using downlink communication link 225. For example, UE 215 may receive control signaling 230 from base station 205 via downlink communication link 225. The control signaling 230 may include information scheduling one or more resource blocks 235.

In some examples, the UE 215 and the base station 205 may communicate using one or more time-frequency resources divided into intervals based on a radio frame structure. For example, a radio frame may be divided into time-frequency subframes, which may include a number of slots (e.g., in the time domain) and subcarriers (e.g., in the frequency domain). Each slot may include multiple symbols (e.g., 14 symbols), which may be referred to as OFDM symbols. The size of the slot may depend on the SCS, which is the width of the subcarrier in the frequency domain. For example, there may be different SCS modes based on the frequency range the UE 215 and base station 205 use to communicate (e.g., a 15, 30, or 60 kHz SCS mode for Frequency Range 1 (FR1) and 60, 120, or 240 kHz SCS mode for Frequency Range 2 (FR2), which may include mmWave frequencies). The slot length may decrease as SCS increases (e.g., 60 kHz for FR1 and 120 kHz for FR2 may have relatively small slot length). The resource block 235 may include one or more time-frequency resources, which may be a number of consecutive subcarriers (e.g., 12 subcarriers) in the frequency domain and one or more slots in the time domain.

In some cases, the resource block 235 may include one or more SSBs 240, which may include one or more PBCH blocks. Wireless networks, such as wireless communications system 200, may use one or more SSBs 240 to support connection establishment or modification between the base station 205 and the UE 215 (e.g., in an initial cell search). For example, from the SSB 240, the UE 215 may synchronize in the time domain, the frequency domain, or both with the base station 205 as well as obtain various network information. Each SSB 240 may span a number of time-frequency resources (e.g., 4 symbols and 239 subcarriers) and may include a primary synchronization signal (PSS), one or more PBCHs, a secondary synchronization signal (SSS), or a combination thereof. In some examples, the PSS and the SSS may span subcarriers 56 to 182 and may be located in symbol 0 and symbol 2, respectively, and the PBCHs may be located throughout the SSB including in symbols 1 through 3 and spanning subcarriers 0 to 239. The SSS and PBCH may be transmitted according to an FDM communication scheme.

In some cases, the PSS and the SSS may be mapped to subcarriers, such as 127 subcarriers, according to a number of possible sequences (e.g., 3 possible sequences according to frequency domain-based M-sequence for the PSS and 1008 possible sequences according to frequency domain-based Gold Code sequence for the SSS). During an initial cell search operation, the UE 215 may search for the PSS using a sliding window (e.g., a set of timing hypothesis) and correlation technique. That is, for each timing hypothesis, the UE 215 may try the 3 sequences plus the number of the frequency hypothesis to account for doppler shift, internal clock frequency shifts, or any other frequency related errors. In some examples, the PSS may include information such as symbol timing, an initial frequency offset estimation, a cell identifier part 2 (e.g., 1 out of 3 possible values, $N_{ID}^{(2)}$=0, 1,2), or a combination thereof. The PSS may be M-sequence based (e.g., with 3 possible sequences mapped to a subcarrier length of 127) and may span 1 symbol in time. In some examples, the SSS may include information such as a cell identifier part 1 (e.g., 1 out of 366 possible values). The SSS may be based on 2 M-sequences, which may be referred to as Gold Code and may be different according to cyclic shifts (e.g., $m_0 = (3\lfloor N_{ID}^{(1)}/112 \rfloor + N_{ID}^{(2)})5$ and $m_1 = (N_{ID}^{(1)} \bmod (112))$) with 336 possible sequences mapped to a subcarrier length of 127. The SSS may span 1 symbol in time. In some cases, the timing and frequency of the PSS and the SSS may be unknown at the UE 215. The UE 215 may determine the cell identifier based on the cell identifier part 1 and the cell identifier part 2 (e.g., $N_{ID}^{cell} = N_{ID}^{(1)} + N_{ID}^{(2)}$).

In some cases, the base station 205 may quadrature phase shift key (QPSK) modulate the PBCHs, so the UE 215 may demodulate the PBCHs using an associated reference signal, such as a DMRS. The UE 215 may use the DMRS for channel estimation, to determine least significant bits (e.g., 3 least significant bits for FR2) of an SSB index per half frame from the DMRS sequence index, or both. The DMRS may include interleaved resource elements, such as 144 resource elements, with PBCH data periodically (e.g., every fourth subcarrier). The PBCH may include a number of resource elements (e.g., 576 resource elements), which may be distributed over a number of bits, such as 31 for FR2. In some examples, one or more bits of the PBCH may be multiplexed in Layer 1 (L1). For example, a 4 bit SFN, a half-frame bit, 3 bits (e.g., for FR2) indicating a most significant bit of an SSB index, or a combination thereof may be multiplexed in L1. In some examples, the PBCH may carry the master information block (MIB). The MIB may include information, such as a 6 bit SFN, a 1 bit SCS common, a 4 bit SSB subcarrier offset, a 1 bit DMRS TypeA position, a PDCCH configuration for a SIB such as SIB1 (e.g., 4 bits for CORESET0 and 4 bits for search space 0), 1 bit for a cell barred flag, 1 bit for an intra-frequency reselection parameter, and a spare bit. The timing and frequency of the PBCH may be unknown at the UE 215. The UE 215 may use the DMRS, SSS, PSS, or a combination thereof in the SSB 240 to refine a frequency offset estimation.

Placement of SSBs 240 within the resource block may be based on the frequency band of the network and associated SCS. While this approach has been acceptable for lower frequency band networks (e.g., sub-6 GHz wireless networks), such approaches may be insufficient for wireless network operating in a higher frequency band and having an associated higher SCS. For example, the duration of a symbol (e.g., the symbol length) may be relatively small in a high frequency band network (e.g., FR2), beam switching gaps cannot be absorbed into the cyclic prefix. This may warrant leaving a symbol level gap for beam switching in the SSB placement (e.g., to support switching between beams). Moreover, a long burst of SSB sweeping may prevent inserting traffic during the burst. For an uplink burst, the downlink/uplink delay is non-trivial (e.g., is not in just a few symbols anymore). Accordingly, there may be no point in keeping a small uplink portion (e.g., two symbols) in the slot as the downlink/uplink gap is bigger than that. If there is an uplink segment during an SSB burst period, the UE 215 may leave a multi-slot gap in the SSB placement. Accordingly, aspects of the described techniques address how to place the SSBs in the slots for a high frequency band/high SCS wireless network, such as a wireless network operating in a >52.6 GHz frequency band or some other high frequency band.

In some examples, the UE 215 may receive control information, such as DCI with a format 1_0, including a grant for a SIB (e.g., SIB1). The UE 215 may receive a DCI message using a CORESET of a PDCCH. For example, base station 205 may transmit the DCI using a PDCCH of Type 0 on search space set 0 on CORESET0 245. The CORESET and the search space set may include a set of time-frequency resources for downlink transmissions on the PDCCH. The DCI may have a number of bits (e.g., 37, 39, or 41 bits) CRC scrambled by a system information-radio network temporary identifier (SI-RNTI). For example, the DCI may include a 9, 11, or 13 bit frequency domain resource allocation (FDRA) ($\lceil \log_2(N_{RB}(N_{RB}+1)/2 \rceil$, $N_{RB}$=size of CORESET0), a 4 bit TDRA, a 1 bit VRB-to-PRB mapping (0=non-interleaved, 1=interleaved), a 5 bit MCS, a 2 bit RV, a 1 bit SI indicator (0=SIB1, 1=SI message), and 15 reserved bits.

In some cases, the SSB 240 and CORESET, such as the CORESET0 245, may be multiplexed for one or more frequency ranges (e.g., FR2). For example, in a first multiplexing pattern the SSB 240 and the CORESET0 245 symbols may be multiplexed according to a TDM scheme, in a second multiplexing pattern the SSB 240 and the CORESET0 245 may use different SCSs and may be multiplexed according to an FDM and TDM scheme, and in a third multiplexing pattern the SSB 240 and the CORESET0 245 may use a same SCS and may be multiplexed according to an FDM scheme. In some examples, the MIB may carry a configuration (e.g., pdcch-ConfigSIB1) with one or more parameters (controlResourceSetZero, searchSpaceZero, or the like) indicating a multiplexing pattern, a CORESET0 frequency offset, a number of resource blocks, a number of symbols, a CORESET0 time location (e.g., a value of 0 is used for the second and third multiplexing patterns), or a combination thereof. In some examples, the CORESET0 may be 1, 2, 3, or any other number of symbols long and may include 24, 48, 96, or any other number of resource blocks.

In some examples, higher frequency operating bands (e.g., for NR) may have larger bandwidths. For a larger bandwidth, the UE 215 may consider several waveforms for downlink operation. For example, the UE 215 may consider single carrier frequency domain implementation (e.g., DFT-s-OFDM) for low Peak-to-Average Power Ratio (PAPR) (e.g., for relatively better coverage), single tap frequency domain equalization (FDE), relatively efficient BW utilization (no guard band used), or a combination thereof. In some other examples, the UE 215 may consider single carrier time domain implementation (e.g., SC-QAM) for relatively low PAPR (e.g., better coverage), relatively low complexity implementation (e.g., no Fast Fourier Transform (FFT) or Inverse fast Fourier Transform (IFFT)), or both. In some cases, the UE 215 may consider OFDM for relatively high PAPR, relatively high SNR, improved spectral efficiency, higher order MIMO to achieve relatively high data rate, single tap FDE, relatively efficient bandwidth utilization (e.g., no guard band used), FDM capability, or a combination thereof.

For communications using relatively high frequency bands, the base station 205 may increase SCS, such as to 960, 1920, 3840 kHz, or the like, to combat phase noise and to increase the overall channelization bandwidth (e.g., with a manageable FFT size). As SCS increases, the symbol time and cyclic prefix may decrease proportionally. The cyclic prefix may refer to a guard period between symbols, which may include a repetition of a symbol to reduce inter-symbol interference. When the UE 215 performs a beam switching operation, UE 215 may wait for a delay between consecutive SSB beams, such as a beam switching gap 250, to facilitate a switching (e.g., approximately 100 ns). The cyclic prefix length may be long enough (e.g., 100 ns) to absorb the beam switching gap 250, thus the UE 215 may not implement explicit gaps. However, for higher bands, which may have a higher SCS, as the symbols and the cyclic prefix become shorter, absorbing a beam switching gap 250 in a cyclic prefix may not be possible (e.g., for SCS=3840 kHz, the cyclic prefix=18.3 ns<100 ns). That is, a beam switching gap 250 may be considerable in length compared to the symbol and may have a relatively large overhead and wasted resources, which is described in further detail with respect to FIGS. 3A and 3B. For example, a gap may extend to symbol level resolution.

In some examples, such as to reduce multiple beam switching gaps 250 for the SSB 240 and the CORESET0 245, the UE 215 may group the SSB 240 and the CORESET0 245 for each beam in the time domain in a single resource block 235 (e.g., a SS/PBCH/CORESET0 block (SSCB)). For example, the UE 215 may receive control signaling 230, such as RRC signaling, from base station 205 via downlink communication link 225. The control signaling 230 may include a resource configuration 255 for the resource block 235. For example, the resource configuration 255 may indicate to the UE 215 that the resource block 235 includes the SSB 240 and the CORESET0 245. Thus, the UE 215 may use a single beam switching gap 250 for both the SSB 240 and the CORESET0 245. The resource configuration 255 may include a number of symbols that make up the beam switching gap 250, which is described in further detail with respect to FIGS. 4A and 4B. In some other examples, the UE 215 may autonomously determine the resource configuration 255 (e.g., based on the resource configuration 255 being preconfigured or predetermined at the UE 215). At 260, the UE 215 may decode the SSB 240 and the CORESET0 245 in the resource block 235. The UE 215 may perform a beam switching operation using the beam switching gap 250. In some examples, the UE 215 may communicate (e.g., data or control signaling) to the base station 205 via uplink communication link 220 based on performing the beam switching operation.

In some examples, the UE 215 may perform channel estimation prior to performing the beam switching operation. The UE 215 may use one or more reference signals for the channel estimation. For example, the UE 215 may perform channel estimation for the CORESET0 245 using a shared reference signal with an SSB 240, which is described in further detail with respect to FIGS. 5A and 5B. In some other examples, the UE 215 may perform channel estimation using a different reference signal than an SSB reference signal, which is described in further detail with respect to FIG. 6.

FIGS. 3A and 3B illustrate examples of resource diagrams 300 that support time domain SSB and CORESET multiplexing in accordance with one or more aspects of the present disclosure. In some examples, resource diagrams 300 may implement aspects of wireless communication system 100 and wireless communications system 200. For example, resource diagram 300-a and resource diagram 300-b may be implemented by a UE 115, a UE 215, a base station 105, and a base station 205 as described with reference to FIGS. 1 and 2. In some cases, a UE may group an SSB 305 and a CORESET, such as CORESET0 310, for each beam in the time domain in a resource block to reduce a beam switching gap 315.

In some examples, a UE may implement one or more multiplexing patterns for transmitting data or control signaling to a base station. For example, in resource diagram 300-a, the UE may apply a TDM scheme to an SSB 305 and a CORESET0 310 according to Multiplexing Pattern 1. That is, the UE may receive the SSB 305 and the CORESET0 310 at different times. In some other examples, in resource diagram 300-b, the UE may apply FDM and TDM schemes to the SSB 305 and the CORESET0 310 according to Multiplexing Pattern 2. That is, the UE may receive the SSB 305 and the CORESET0 310 at different times and using different frequency resources. However, for Multiplexing Pattern 1 and Multiplexing Pattern 2, the beam switching gaps 315 may exist between each SSB 305 and each CORESET0 310, which may result in inefficient use of resources (e.g., by doubling the wasted resources if the gaps are unnecessary). In some cases, the UE may not be able to multiplex the SSB 305 and the CORESET0 310 according to an FDM scheme, such as for an additional multiplexing pattern (e.g., Multiplexing Pattern 3). For example, the UE may not be able to use the Multiplexing Pattern 3 in single carrier waveform cases (e.g., in SC-QAM).

Thus, the UE may reduce the effects and duplication of the beam switching gaps 315 by combining the SSB 305 and the CORESET0 310 into a resource block. In some cases, as described with reference to FIG. 2, the UE may receive an indication from a base station that the SSB 305 and the COREST0 310 may be combined. For example, the base station may transmit a resource configuration via control signaling (e.g., RRC signaling). In some other cases, the UE may determine the SSB 305 and the CORESET0 310 are combined independent of the base station.

FIGS. 4A and 4B illustrate examples of resource diagrams 400 that support time domain SSB and CORESET multiplexing in accordance with one or more aspects of the present disclosure. In some examples, resource diagram 400-a and resource diagram 400-b may implement aspects of wireless communication system 100, wireless communications system 200, and resource diagrams 300. For example, resource diagram 400-a and resource diagram 400-b may be implemented by a UE 115, a UE 215, a base station 105, and a base station 205 as described with reference to FIGS. 1 and 2. In some cases, a base station may transmit control signaling to a UE including an indication of one or more time-frequency resources to use for a beam switching operation after decoding a resource block including an SSB 405 and a CORESET, such as a CORESET0 410.

In some examples, to minimize multiple beam switching gaps 415 for an SSB 405 and CORESET0 410, a base station may group the SSB and CORESET0 in the time domain in an SSCB. Although the SSB 405 is grouped before the CORESET0 410 in FIGS. 4A and 4B, the SSB 405 and the CORESET0 410 may be located in any order within a resource block. The grouped SSB 405 and the CORESET0 410 may be followed by a beam switching gap 415. The UE may receive any number of grouped SSBs 405 and CORESET0s 410 in the same or different resource blocks. In some examples, the waveforms for the SSB 405 and the CORESET0 410 may be the same or different depending on the type of communication. The SSB 405 may carry an MIB, which may specify or otherwise indicate the frequency allocation (e.g., if the waveform is DFT-s-OFDM or OFDM), bandwidth, time duration, or a combination thereof of the CORESET0 410. The bandwidth of the CORESET0 410 may be different than that of the SSB 405.

In some examples, the UE and the base station may communicate using a different SCS configuration. For example, resource diagram 400-a may implement SCS1, which may be a larger SCS when compared with SCS2 in resource diagram 400-b. With the larger SCS, the cyclic prefix 420 may be relatively small or nonexistent, so the UE may use one or more time-frequency resources in the form of a beam switching gap 415. In some examples, the base station may transmit an indication of the number of resources (e.g., a number of symbols, a frequency indication, or a time duration) included in the beam switching gap 415. In some cases, if the SCS is small enough, the UE may use a cyclic prefix 420 (e.g., an SSB cyclic prefix) as the beam switching gap. For example, in resource diagram 400-b, the cyclic prefix 420 may absorb a beam switching gap 415. Thus, the UE may not use an explicit beam switching gap 415 (e.g., the indicated time-frequency resources may be 0).

FIGS. 5A and 5B illustrate examples of resource diagrams 500 that supports time domain SSB and CORESET multiplexing in accordance with one or more aspects of the present disclosure. In some examples, resource diagram 500-a and resource diagram 500-b may implement aspects of wireless communication system 100, wireless communications system 200, resource diagrams 300, and resource diagrams 400. For example, resource diagram 500-a and resource diagram 500-b may be implemented by a UE 115, a UE 215, a base station 105, and a base station 205 as described with reference to FIGS. 1 and 2. In some cases, a UE may perform channel estimation prior to performing a beam switching operation using one or more reference signals.

In some examples, a UE may receive a resource block, such as an SSCB, including an SSB 505 and a CORESET, such as a CORESET0 510. The UE may use the information in the SSB 505 and the CORESET 510 to perform a beam switching operation during a beam switching gap 515 or a cyclic prefix as described with reference to FIG. 4. Prior to performing the beam switching operation, the UE may perform a channel estimation operation based on one or more reference signals, which the UE may receive in the SSB 505, the CORESET0 510, or both. The number of reference signal symbols in the SSB 505 and in the CORESET0 510 may be 0, 1, or more. In some examples, the UE may perform channel estimation for the CORESET0 510 using a shared reference signal 520 with the SSB 505. In some other examples, the UE may perform channel estimation using a different reference signal than an SSB reference signal, which is described in further detail with respect to FIG. 6.

In some examples, the channel estimation reference signal for the CORESET0 510 (e.g., a DMRS) may be shared with the reference signal used for channel estimation for the PBCH in the SSB 505 (e.g., a DMRS for a PBCH), which may reduce the number of resources used for channel estimation. In some cases, for resource diagram 500-a, the bandwidths of the SSB 505 and the CORESET 510 may be the same. Thus, the UE may use the shared reference signal 520 for the CORESET0 510 and the SSB 505. In some other cases, for resource diagram 500-b, the bandwidths of the SSB 505 and the CORESET0 510 may be different. The UE may select a shared reference signal 520 for performing the channel estimation. In some examples, the UE may select the shared reference signal 520 based on the reference signal with the wider bandwidth channel.

In some cases, for resource diagram 500-b, if the bandwidth of the CORESET0 510 is different from the bandwidth of the SSB 505, the UE may use a shared reference signal 520 based on performing a channel estimation operation or procedure. For example, the UE may perform channel estimation to decode the SSB 505 to determine a bandwidth of the CORESET0 510. The UE may determine the bandwidth of the CORESET0 510 to use for the channel estimation based on a fixed bandwidth, which may be preconfigured or otherwise specified, the UE may blind multiple bandwidth options for a reference signal (e.g., a DMRS), the UE may receive an indication of the bandwidth in a synchronization signal from the base station, the UE may use a portion of the bandwidth that overlaps with the SSB 505.

FIG. 6 illustrates an example of a resource diagram 600 that supports time domain SSB and CORESET multiplexing in accordance with one or more aspects of the present disclosure. In some examples, resource diagram 600 may implement aspects of wireless communication system 100, wireless communications system 200, and resource diagrams 300 through resource diagrams 500. For example, resource diagram 600 may be implemented by a UE 115, a UE 215, a base station 105, and a base station 205 as described with reference to FIGS. 1 and 2. In some cases, a UE may perform channel estimation prior to performing a beam switching operation using one or more reference signals.

In some examples, a UE may receive a resource block, such as an SSCB, including an SSB 605 and a CORESET, such as a CORESET0 610. The UE may use the information in the SSB 605 and the CORESET 610 to perform a beam switching operation during a beam switching gap 615 or a cyclic prefix as described with reference to FIG. 4. Prior to performing the beam switching operation, the UE may perform a channel estimation operation based on one or more reference signals, which the UE may receive in the SSB 605, the CORESET0 610, or both, as described with respect to FIG. 5. In some examples, the UE may perform channel estimation using a different reference signal than an SSB reference signal. For example, if the bandwidth of the SSB 605 and the bandwidth of the CORESET0 610 are different, the UE may use one or more reference signals for channel estimation different from the reference signals in the SSB 605. That is, the UE may receive an SSB reference signal 620 and may use a different reference signal (e.g., CORESET0 reference signal 625) for channel estimation. In some examples, a CORESET0 may not be present or transmitted by a base station. Thus, the UE may receive an additional reference signal with which to perform channel estimation.

Figure 7:
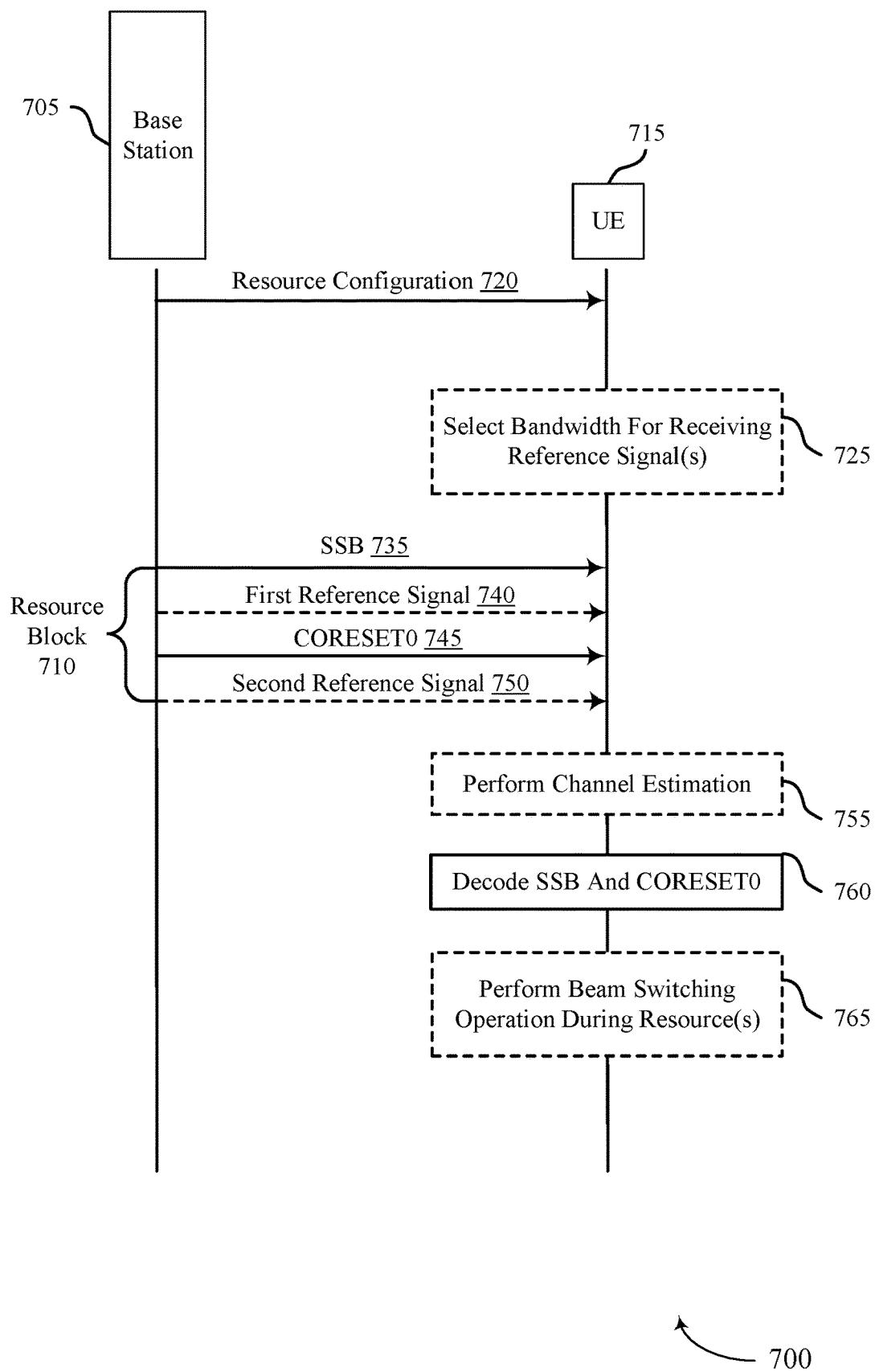
FIG. 7 illustrates an example of a process flow that supports time domain SSB and CORESET multiplexing in accordance with one or more aspects of the present disclosure.

FIG. 7 illustrates an example of a process flow 700 that supports time domain SSB and CORESET multiplexing in accordance with one or more aspects of the present disclosure. In some examples, process flow 700 may implement aspects of wireless communications system 100, wireless communication system 200, and resource diagrams 300 through resource diagram 600. The process flow 700 may illustrate an example of a base station 705 transmitting a resource block 710 that includes a grouped SSB and a CORESET0 followed by a beam switching gap to a UE 715. Alternative examples of the following may be implemented, where some processes are performed in a different order than described or are not performed. In some cases, processes may include additional features not mentioned below, or further processes may be added.

At 720, the base station 705 may transmit a resource configuration for a resource block including an SSB and a CORESET, such as a CORESET0, to the UE 715. The resource configuration may be based on a SCS configuration and the resource block may be associated with a frequency band of a base station. That is, the resource configuration may group the SSB and the CORESET in a single resource block based on the UE 715 operating using relatively high frequency bands (e.g., for mmWave communications) and having a relatively high or relatively low SCS. If the SCS configuration indicates a relatively low SCS, the UE may use a cyclic prefix to perform a beam switching operation. If the SCS configuration indicates a relatively high SCS, the UE 715 may use a number of resources for the beam switching operation. In some examples, the UE 715 may receive an indication of the number of resources, which may be referred to as a beam switching gap, based on the SCS configuration.

At 725, the UE 715 may select a bandwidth for receiving a reference signal for the SSB, the CORESET, or both. For example, the UE 715 may determine a bandwidth of the SSB and the CORESET and may select either the SSB bandwidth or the CORESET bandwidth. In some examples, the UE 715 may select the greater bandwidth. The UE 715 may perform a channel estimation procedure to determine the bandwidths of the SSB, the CORESET, or both. The bandwidth of the CORESET may be a fixed bandwidth, the UE 715 may blindly select the CORESET bandwidth, the base station 705 may transmit an indication of the CORESET bandwidth to the UE 715 in a synchronization signal, the CORESET bandwidth may be a portion of bandwidth that overlaps with the SSB, or a combination thereof.

At 735, UE 715 may receive an SSB from the base station 705 within the resource block (e.g., the CORESET associated with a broadcast channel). The UE 715 may receive the SSB according to the resource configuration (e.g., grouped with the CORESET). For example, the UE 715 may receive both the SSB and CORESET, in either order, prior to performing a beam switching operation. Thus, there may be a single beam switching gap for the grouped SSB and CORESET. In some examples, the SSB may include a MIB (e.g., in a PBCH), which may indicate one or more frequency resources, a bandwidth, a time duration, or a combination thereof of the CORESET. In some examples, the UE 715 may receive the SSB using a bandwidth different from the bandwidth indicated in the MIB.

At 740, UE 715 may receive a reference signal for the SSB.

At 745, UE 715 may receive the CORESET from the base station 705 within the resource block (e.g., the CORESET associated with a broadcast channel). The UE 715 may receive the CORESET according to the resource configuration (e.g., grouped with the SSB). In some cases, the UE 715 may receive the SSB and the CORESET using the same waveform. In some other cases, the UE 715 may receive the SSB and the CORESET using different waveforms.

At 750, UE 715 may receive another reference signal for the CORESET. The first reference signal for the SSB and the second reference signal for the CORESET may be shared (e.g., the same). For example, if the UE 715 uses a same bandwidth to receive the SSB and the CORESET, the SSB and CORESET may share a reference signal.

At 755, UE 715 may perform a channel estimation procedure based on a reference signal different from the first reference signal for the SSB.

At 760, UE 715 may decode the SSB and the CORESET based on performing the channel estimation procedure.

At 765, UE 715 may perform a beam switching operation during one or more resources (e.g., the beam switching gap or a cyclic prefix of the SSB) based on decoding the SSB and CORESET. For example, if the SCS configuration is relatively low, the UE 715 may perform the beam switching operation during the cyclic prefix of the SSB (e.g., if the size of the cyclic prefix satisfies a threshold value). In some other examples, if the SCS configuration is relatively high, the UE 715 may receive an indication of the resources in which to perform the beam switching operation. synchronization signal block and the control resource set.

Figure 8:
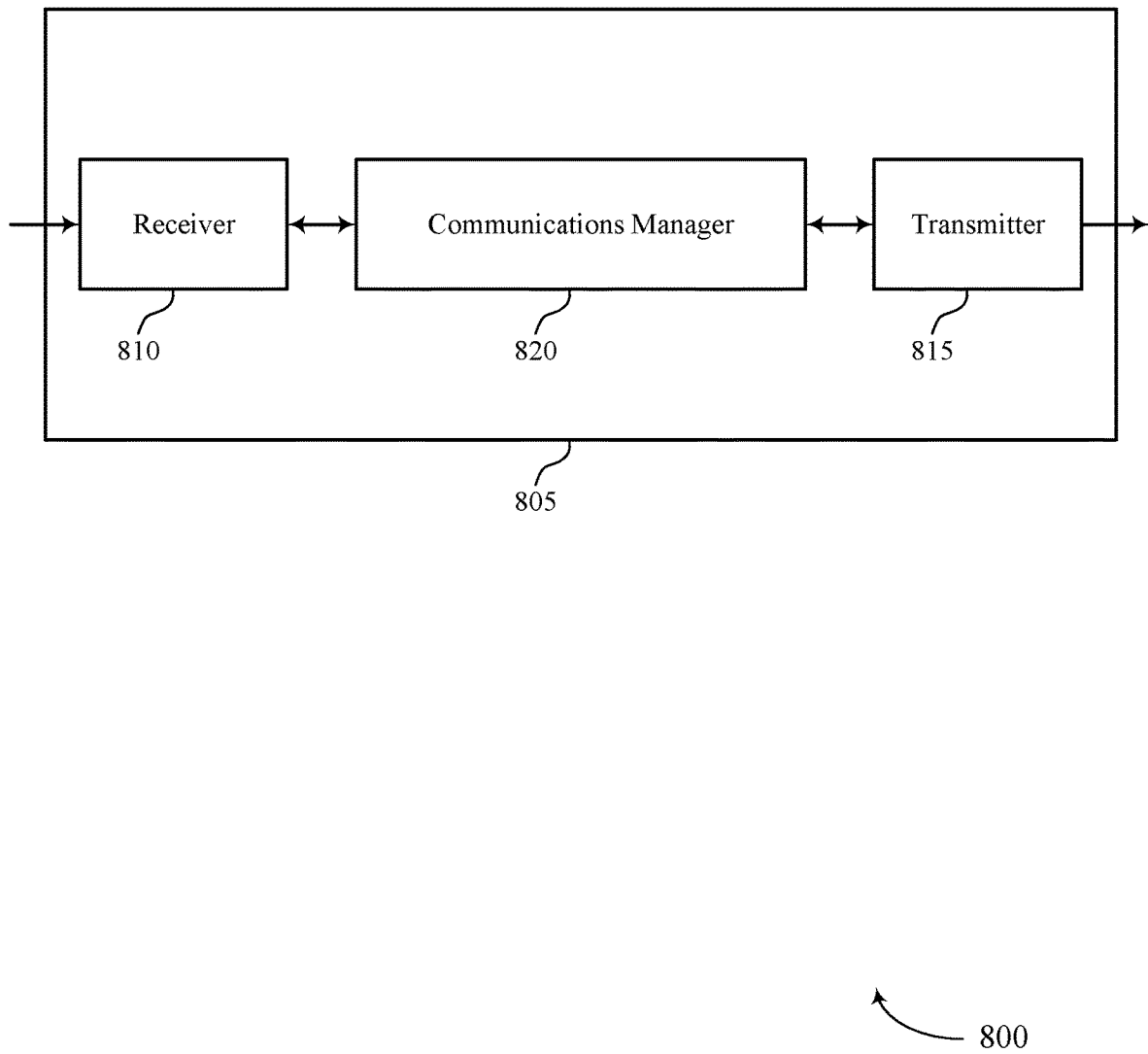
FIGS. 8 and 9 show block diagrams of devices that support time domain SSB and CORESET multiplexing in accordance with one or more aspects of the present disclosure.

FIG. 8 shows a block diagram 800 of a device 805 that supports time domain SSB and CORESET multiplexing in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to time domain SSB and CORESET multiplexing). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to time domain SSB and CORESET multiplexing). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of time domain SSB and CORESET multiplexing as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving a resource configuration for a resource block including an SSB and a CORESET, the resource configuration associated with an SCS configuration and the resource block associated with a frequency band of a base station. The communications manager 820 may be configured as or otherwise support a means for receiving, within the resource block and based on the resource configuration, the SSB and the CORESET. The communications manager 820 may be configured as or otherwise support a means for decoding the SSB and the CORESET.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for grouping an SSB and a CORESET in a resource block, which may reduce processing, cause more efficient utilization of communication resources, and more.

The communications manager 820 may be an example of means for performing various aspects of receiving an SSB and a CORESET within a resource block as described herein. The communications manager 820, or its sub-components, may be implemented in hardware (e.g., in communications management circuitry). The circuitry may comprise of processor, DSP, an ASIC, an FPGA or other programmable logic device, discrete gate or transistor logic, discrete hardware components, or any combination thereof designed to perform the functions described in the present disclosure.

In another implementation, the communications manager 820, or its sub-components, may be implemented in code (e.g., as communications management software or firmware) executed by a processor, or any combination thereof. If implemented in code executed by a processor, the functions of the communications manager 820, or its sub-components may be executed by a general-purpose processor, a DSP, an ASIC, an FPGA or other programmable logic device.

In some examples, the communication manager 820 may be configured to perform various operations (e.g., receiving, determining, transmitting) using or otherwise in cooperation with the receiver 810, the transmitter 815, or both.

Figure 9:
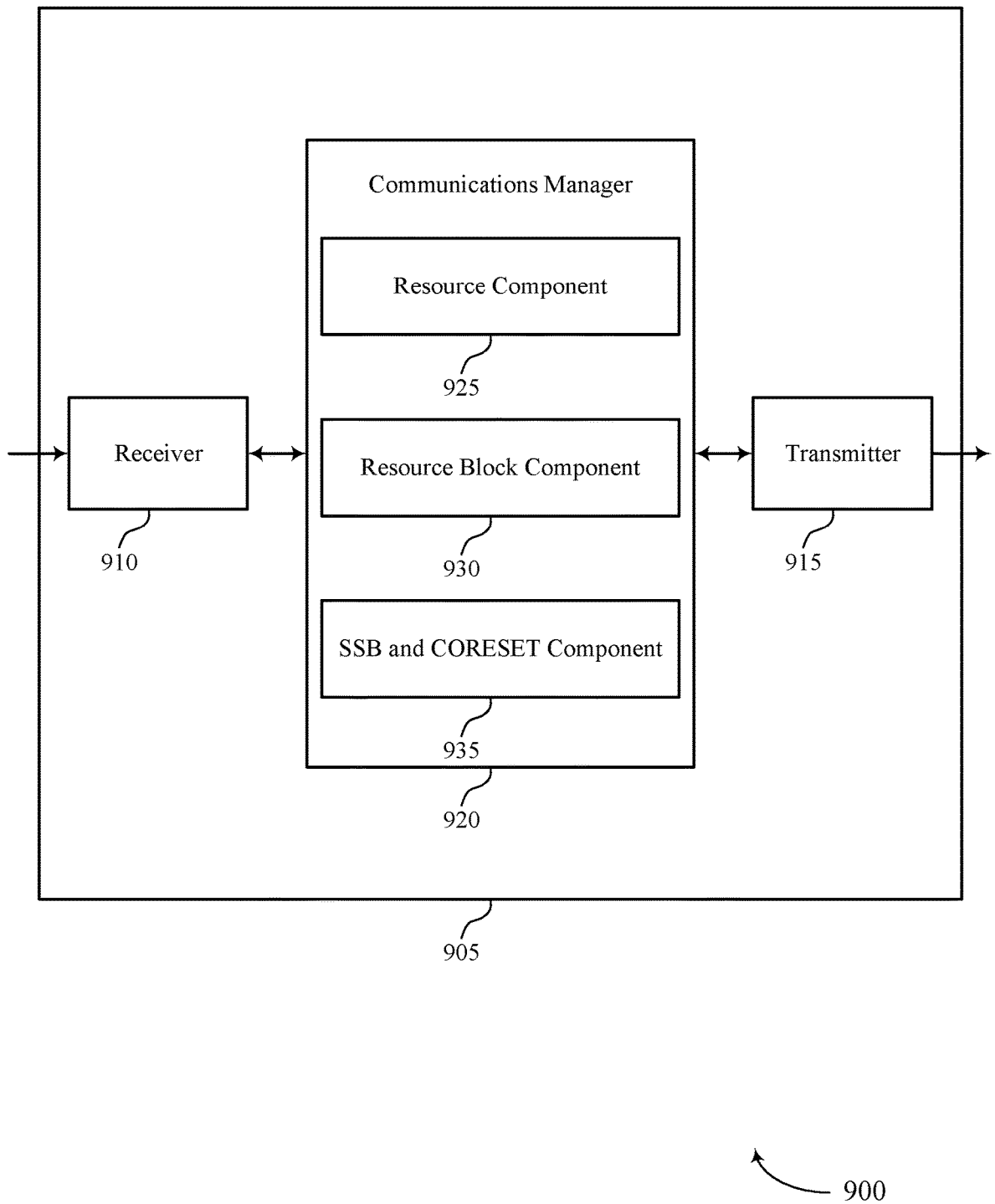

FIG. 9 shows a block diagram 900 of a device 905 that supports time domain SSB and CORESET multiplexing in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to time domain SSB and CORESET multiplexing). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to time domain SSB and CORESET multiplexing). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of time domain SSB and CORESET multiplexing as described herein. For example, the communications manager 920 may include a resource component 925, a resource block component 930, an SSB and CORESET component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The resource component 925 may be configured as or otherwise support a means for receiving a resource configuration for a resource block including an SSB and a CORESET, the resource configuration associated with an SCS configuration and the resource block associated with a frequency band of a base station. The resource block component 930 may be configured as or otherwise support a means for receiving, within the resource block and based on the resource configuration, the SSB and the CORESET. The SSB and CORESET component 935 may be configured as or otherwise support a means for decoding the SSB and the CORESET.

Figure 10:
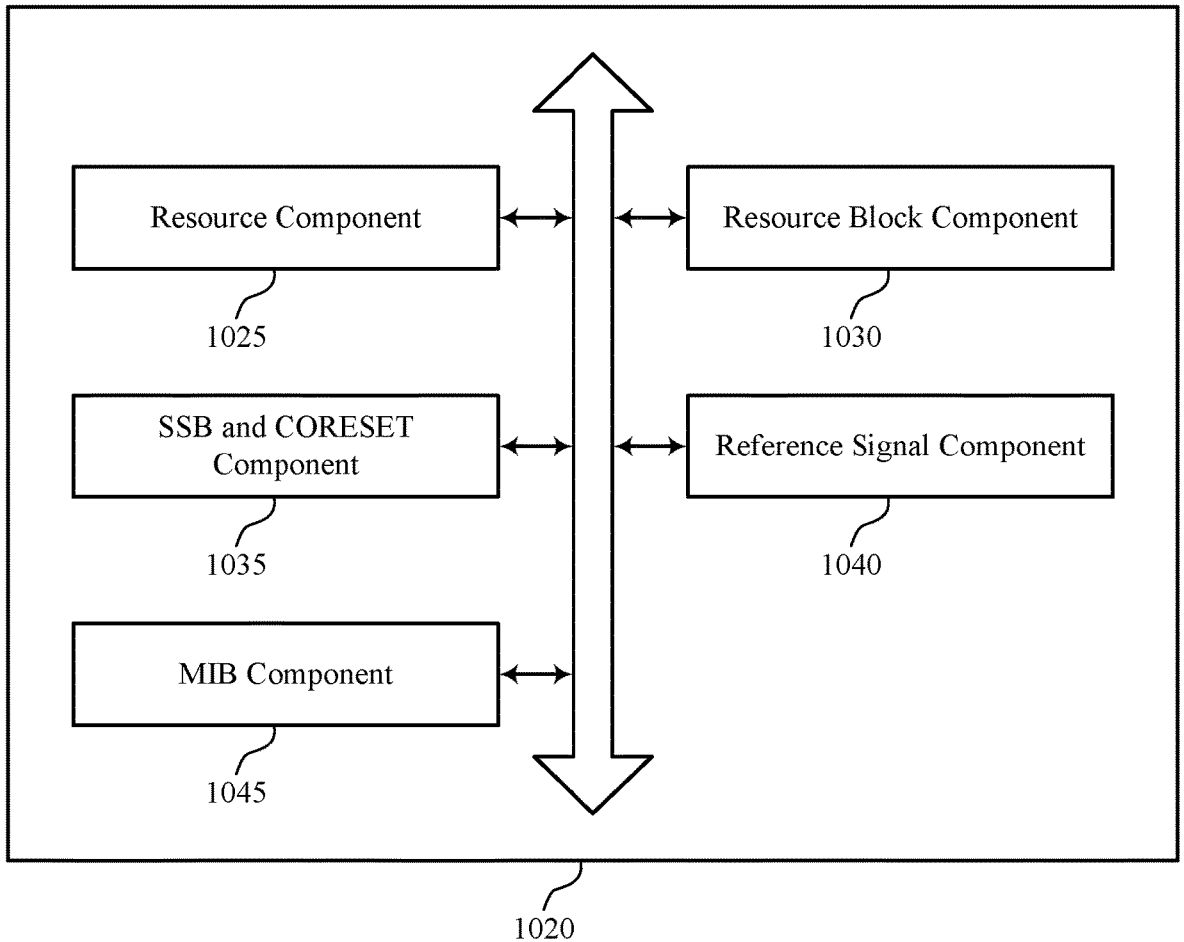
FIG. 10 shows a block diagram of a communications manager that supports time domain SSB and CORESET multiplexing in accordance with one or more aspects of the present disclosure.

FIG. 10 shows a block diagram 1000 of a communications manager 1020 that supports time domain SSB and CORESET multiplexing in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of time domain SSB and CORESET multiplexing as described herein. For example, the communications manager 1020 may include a resource component 1025, a resource block component 1030, an SSB and CORESET component 1035, a reference signal component 1040, a MIB component 1045, or any combination thereof. Each of these components may communicate, directly or indirectly, with one another (e.g., via one or more buses).

The communications manager 1020 may support wireless communications at a UE in accordance with examples as disclosed herein. The resource component 1025 may be configured as or otherwise support a means for receiving a resource configuration for a resource block including an SSB and a CORESET, the resource configuration associated with an SCS configuration and the resource block associated with a frequency band of a base station. The resource block component 1030 may be configured as or otherwise support a means for receiving, within the resource block and based on the resource configuration, the SSB and the CORESET. The SSB and CORESET component 1035 may be configured as or otherwise support a means for decoding the SSB and the CORESET.

In some examples, the reference signal component 1040 may be configured as or otherwise support a means for receiving a first reference signal for the SSB and a second reference signal for the CORESET, the first reference signal being the same as the second reference signal. In some examples, the SSB includes a first bandwidth and the CORESET includes a second bandwidth, the first bandwidth being the same as the second bandwidth.

In some examples, the MIB component 1045 may be configured as or otherwise support a means for receiving a master information block including an indication of one or more frequency resources, a bandwidth, a time duration, or a combination thereof associated with the CORESET. In some examples, the SSB includes a first bandwidth and the CORESET includes a second bandwidth, the first bandwidth being different from the second bandwidth.

In some examples, the resource component 1025 may be configured as or otherwise support a means for receiving an indication of a number of resources associated with a beam switching gap, the number of resources corresponding to the SCS configuration. In some examples, the resource component 1025 may be configured as or otherwise support a means for performing a beam switching operation during the number of resources based on decoding the SSB and the CORESET.

In some examples, performing the beam switching operation during a cyclic prefix associated with the SSB based on a size of the cyclic prefix satisfying a threshold value.

In some examples, the reference signal component 1040 may be configured as or otherwise support a means for selecting one of a first bandwidth or a second bandwidth for receiving a reference signal for the SSB and the CORESET based on the SSB corresponding to the first bandwidth and the CORESET corresponding to the second bandwidth. In some examples, the reference signal component 1040 may be configured as or otherwise support a means for selecting the first bandwidth based on the first bandwidth being greater than the second bandwidth. In some examples, the reference signal component 1040 may be configured as or otherwise support a means for performing a channel estimation procedure to determine the first bandwidth and the second bandwidth, where the second bandwidth is a fixed bandwidth, the UE blindly selects the second bandwidth, the second bandwidth is indicated in a synchronization signal, the second bandwidth is a portion of bandwidth that overlaps with the SSB, or a combination thereof.

In some examples, the reference signal component 1040 may be configured as or otherwise support a means for performing a channel estimation procedure based on a first reference signal, the first reference signal different from a second reference signal associated with the SSB. In some examples, the SSB is associated with a first waveform and the CORESET is associated with a second waveform, the first waveform being different from the second waveform. In some examples, the SSB is associated with a first waveform and the CORESET is associated with a second waveform, the first waveform being the same as the second waveform. In some examples, the SSB and the CORESET correspond to a broadcast channel.

Figure 11:
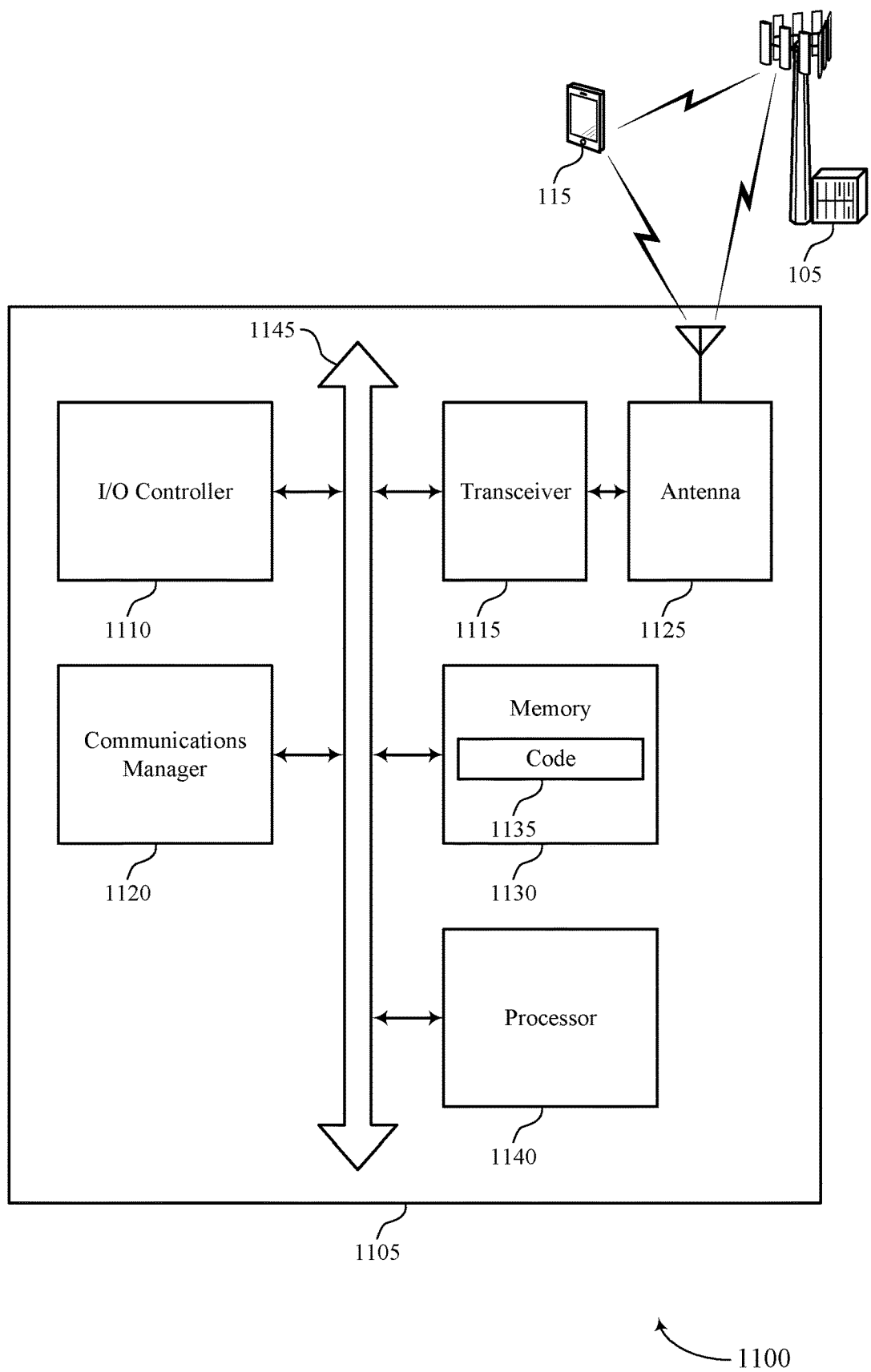
FIG. 11 shows a diagram of a system including a device that supports time domain SSB and CORESET multiplexing in accordance with one or more aspects of the present disclosure.

FIG. 11 shows a diagram of a system 1100 including a device 1105 that supports time domain SSB and CORESET multiplexing in accordance with one or more aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting time domain SSB and CORESET multiplexing). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving a resource configuration for a resource block including an SSB and a CORESET, the resource configuration associated with an SCS configuration and the resource block associated with a frequency band of a base station. The communications manager 1120 may be configured as or otherwise support a means for receiving, within the resource block and based on the resource configuration, the SSB and the CORESET. The communications manager 1120 may be configured as or otherwise support a means for decoding the SSB and the CORESET.

By including or configuring the communications manager 1120 in accordance with examples as described herein, the device 1105 may support techniques for grouping an SSB and a CORESET in a resource block, which may reduce latency, reduced power consumption, cause more efficient utilization of communication resources, improve coordination between devices, improved utilization of processing capability, and more.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of time domain SSB and CORESET multiplexing as described herein, or the processor 1140 and the memory 1130 may be otherwise configured to perform or support such operations.

Figure 12:
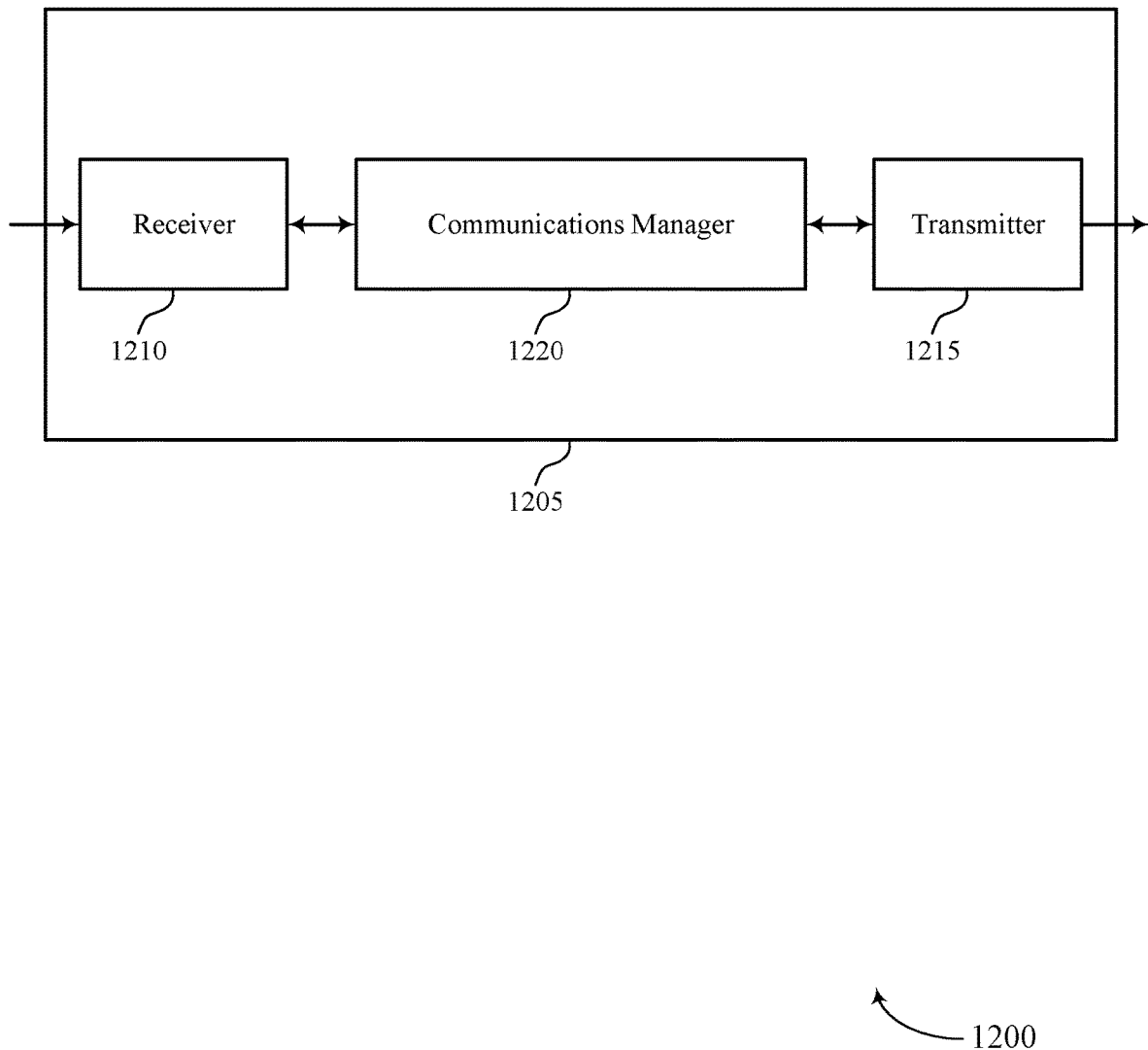
FIGS. 12 and 13 show block diagrams of devices that support time domain SSB and CORESET multiplexing in accordance with one or more aspects of the present disclosure.

FIG. 12 shows a block diagram 1200 of a device 1205 that supports time domain SSB and CORESET multiplexing in accordance with one or more aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to time domain SSB and CORESET multiplexing). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to time domain SSB and CORESET multiplexing). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of time domain SSB and CORESET multiplexing as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. For example, the communications manager 1220 may be configured as or otherwise support a means for encoding an SSB and a CORESET according to a resource configuration for a resource block including the SSB and the CORESET, the resource configuration associated with an SCS configuration and the resource block associated with a frequency band of the base station. The communications manager 1220 may be configured as or otherwise support a means for transmitting, to a UE and within the resource block, the SSB and the CORESET based on the resource configuration.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for grouping an SSB and a CORESET in a resource block, which may reduce processing, cause more efficient utilization of communication resources, and more.

Figure 13:
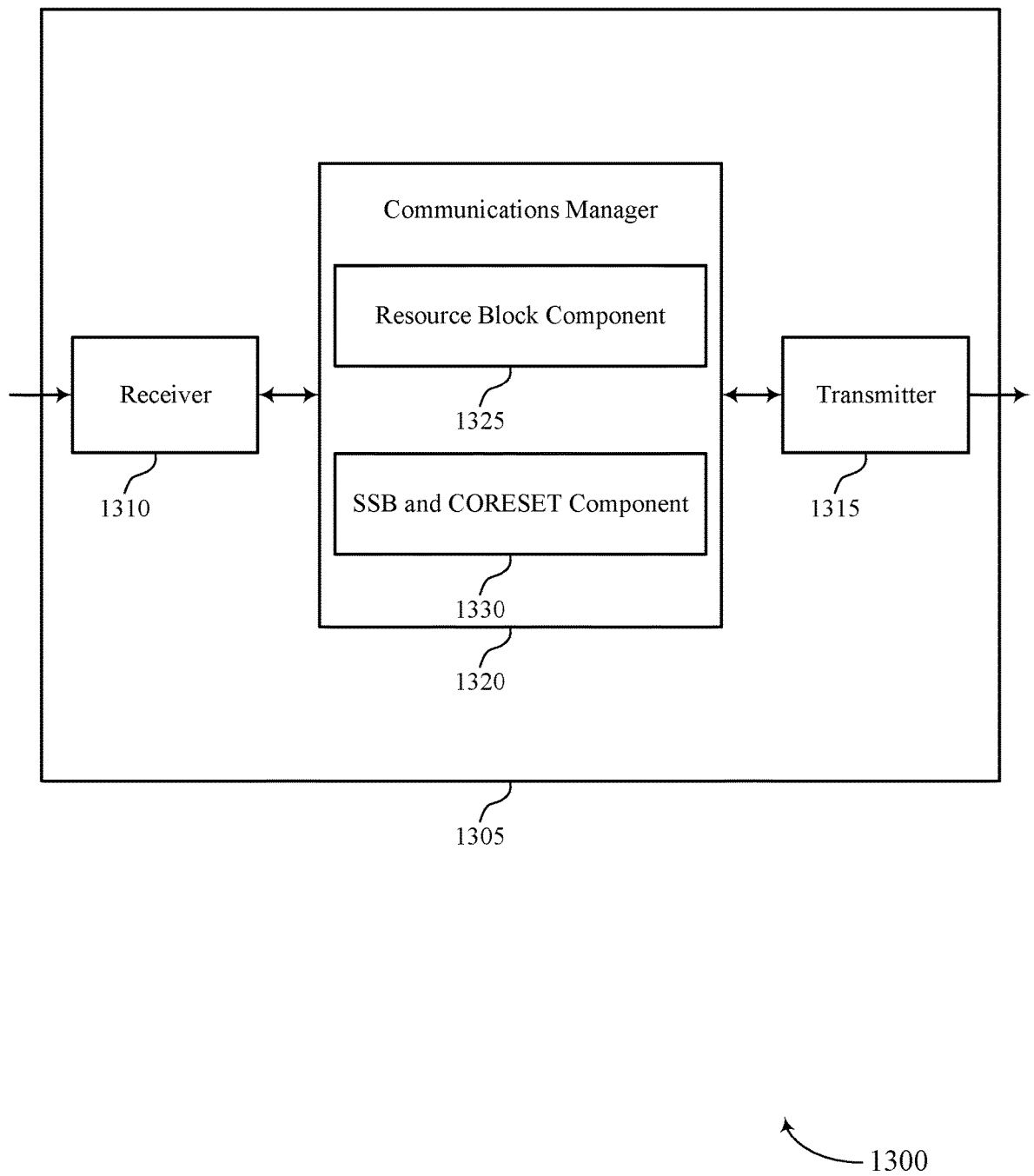

FIG. 13 shows a block diagram 1300 of a device 1305 that supports time domain SSB and CORESET multiplexing in accordance with one or more aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to time domain SSB and CORESET multiplexing). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to time domain SSB and CORESET multiplexing). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of time domain SSB and CORESET multiplexing as described herein. For example, the communications manager 1320 may include a resource block component 1325 an SSB and CORESET component 1330, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. The resource block component 1325 may be configured as or otherwise support a means for encoding an SSB and a CORESET according to a resource configuration for a resource block including the SSB and the CORESET, the resource configuration associated with an SCS configuration and the resource block associated with a frequency band of the base station. The SSB and CORESET component 1330 may be configured as or otherwise support a means for transmitting, to a UE and within the resource block, the SSB and the CORESET based on the resource configuration.

Figure 14:
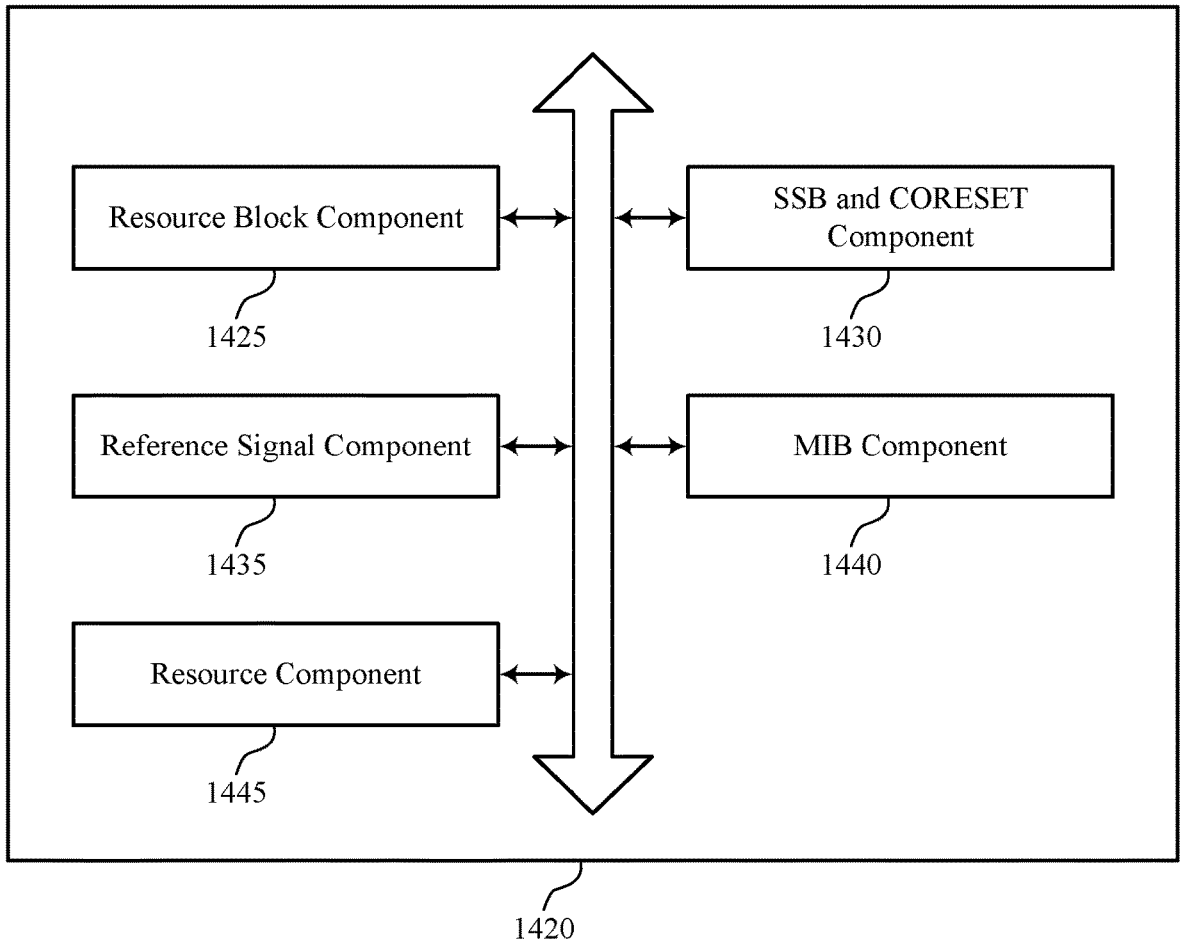
FIG. 14 shows a block diagram of a communications manager that supports time domain SSB and CORESET multiplexing in accordance with one or more aspects of the present disclosure.

FIG. 14 shows a block diagram 1400 of a communications manager 1420 that supports time domain SSB and CORESET multiplexing in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of time domain SSB and CORESET multiplexing as described herein. For example, the communications manager 1420 may include a resource block component 1425, an SSB and CORESET component 1430, a reference signal component 1435, a MIB component 1440, a resource component 1445, or any combination thereof. Each of these components may communicate, directly or indirectly, with one another (e.g., via one or more buses).

The communications manager 1420 may support wireless communications at a base station in accordance with examples as disclosed herein. The resource block component 1425 may be configured as or otherwise support a means for encoding an SSB and a CORESET according to a resource configuration for a resource block including the SSB and the CORESET, the resource configuration associated with an SCS configuration and the resource block associated with a frequency band of the base station. The SSB and CORESET component 1430 may be configured as or otherwise support a means for transmitting, to a UE and within the resource block, the SSB and the CORESET based on the resource configuration.

In some examples, the reference signal component 1435 may be configured as or otherwise support a means for transmitting a first reference signal for the SSB and a second reference signal for the CORESET, the first reference signal being the same as the second reference signal. In some examples, the SSB includes a first bandwidth and the CORESET includes a second bandwidth, the first bandwidth being the same as the second bandwidth.

In some examples, the MIB component 1440 may be configured as or otherwise support a means for transmitting a master information block including an indication of one or more frequency resources, a bandwidth, a time duration, or a combination thereof associated with the CORESET.

In some examples, the SSB includes a first bandwidth and the CORESET includes a second bandwidth, the first bandwidth being different from the second bandwidth. In some examples, the resource component 1445 may be configured as or otherwise support a means for transmitting, to the UE, an indication of the resource configuration including a number of resources associated with a beam switching gap, the number of resources corresponding to the SCS configuration. In some examples, the reference signal component 1435 may be configured as or otherwise support a means for transmitting, to the UE, a synchronization signal including an indication of a bandwidth for receiving a reference signal for the SSB and the CORESET.

In some examples, the reference signal component 1435 may be configured as or otherwise support a means for transmitting a reference signal for the SSB and the CORESET based on the SSB corresponding to a first bandwidth and the CORESET corresponding to a second bandwidth. In some examples, the reference signal component 1435 may be configured as or otherwise support a means for transmitting, to the UE, a synchronization signal including an indication of the second bandwidth.

In some examples, the reference signal component 1435 may be configured as or otherwise support a means for transmitting, to the UE, a first reference signal and a second reference signal associated with the SSB. In some examples, the SSB is associated with a first waveform and the CORESET is associated with a second waveform, the first waveform being different from the second waveform. In some examples, the SSB is associated with a first waveform and the CORESET is associated with a second waveform, the first waveform being the same as the second waveform. In some examples, the SSB and the CORESET correspond to a broadcast channel.

Figure 15:
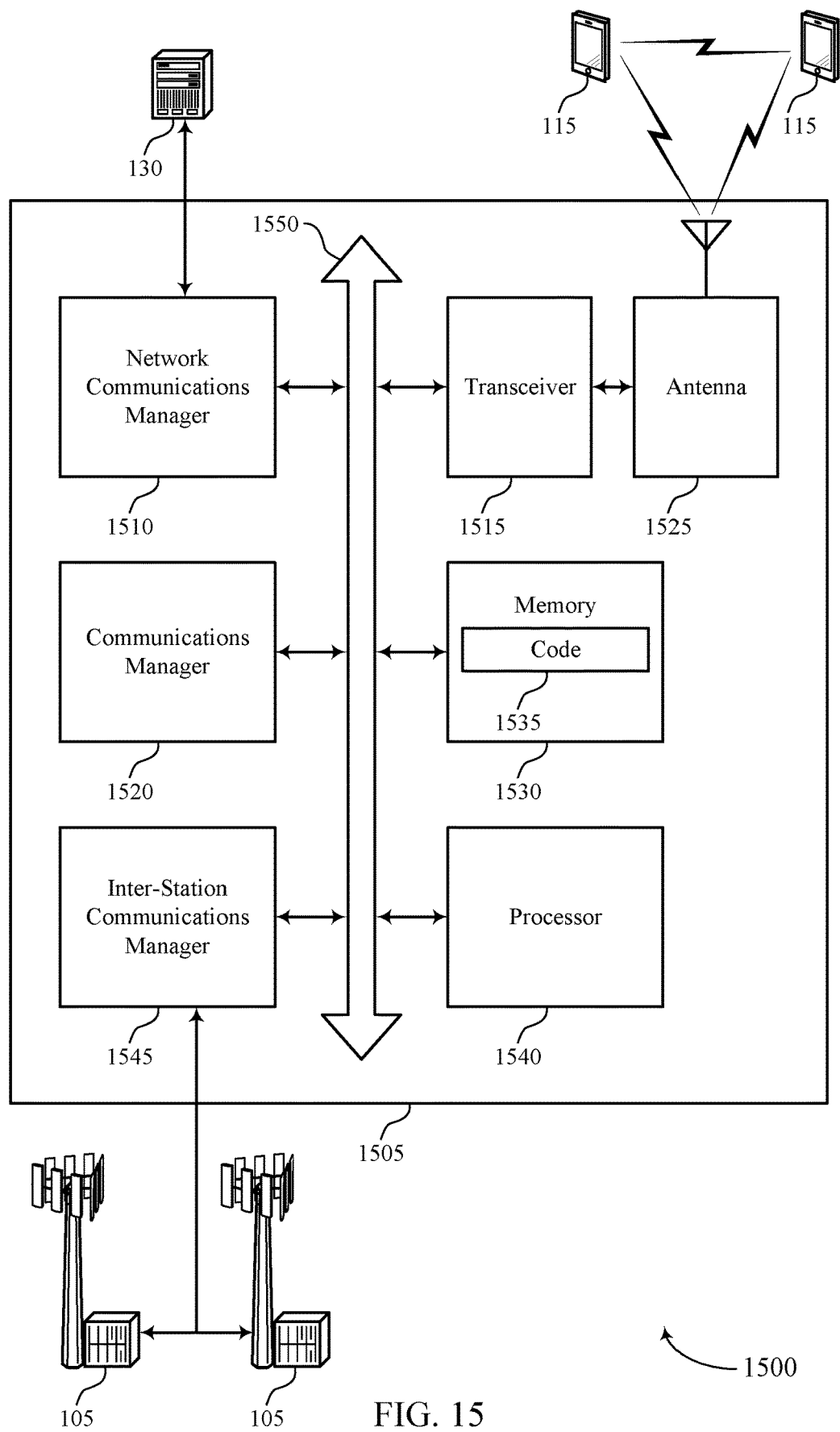
FIG. 15 shows a diagram of a system including a device that supports time domain SSB and CORESET multiplexing in accordance with one or more aspects of the present disclosure.

FIG. 15 shows a diagram of a system 1500 including a device 1505 that supports time domain SSB and CORESET multiplexing in accordance with one or more aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting time domain SSB and CORESET multiplexing). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a base station in accordance with examples as disclosed herein. For example, the communications manager 1520 may be configured as or otherwise support a means for encoding an SSB and a CORESET according to a resource configuration for a resource block including the SSB and the CORESET, the resource configuration associated with an SCS configuration and the resource block associated with a frequency band of the base station. The communications manager 1520 may be configured as or otherwise support a means for transmitting, to a UE and within the resource block, the SSB and the CORESET based on the resource configuration.

By including or configuring the communications manager 1520 in accordance with examples as described herein, the device 1505 may support techniques for grouping an SSB and a CORESET in a resource block, which may improve communication reliability, reduced latency, reduce power consumption, cause more efficient utilization of communication resources, improve coordination between devices, improve utilization of processing capability, and more.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of time domain SSB and CORESET multiplexing as described herein, or the processor 1540 and the memory 1530 may be otherwise configured to perform or support such operations.

Figure 16:
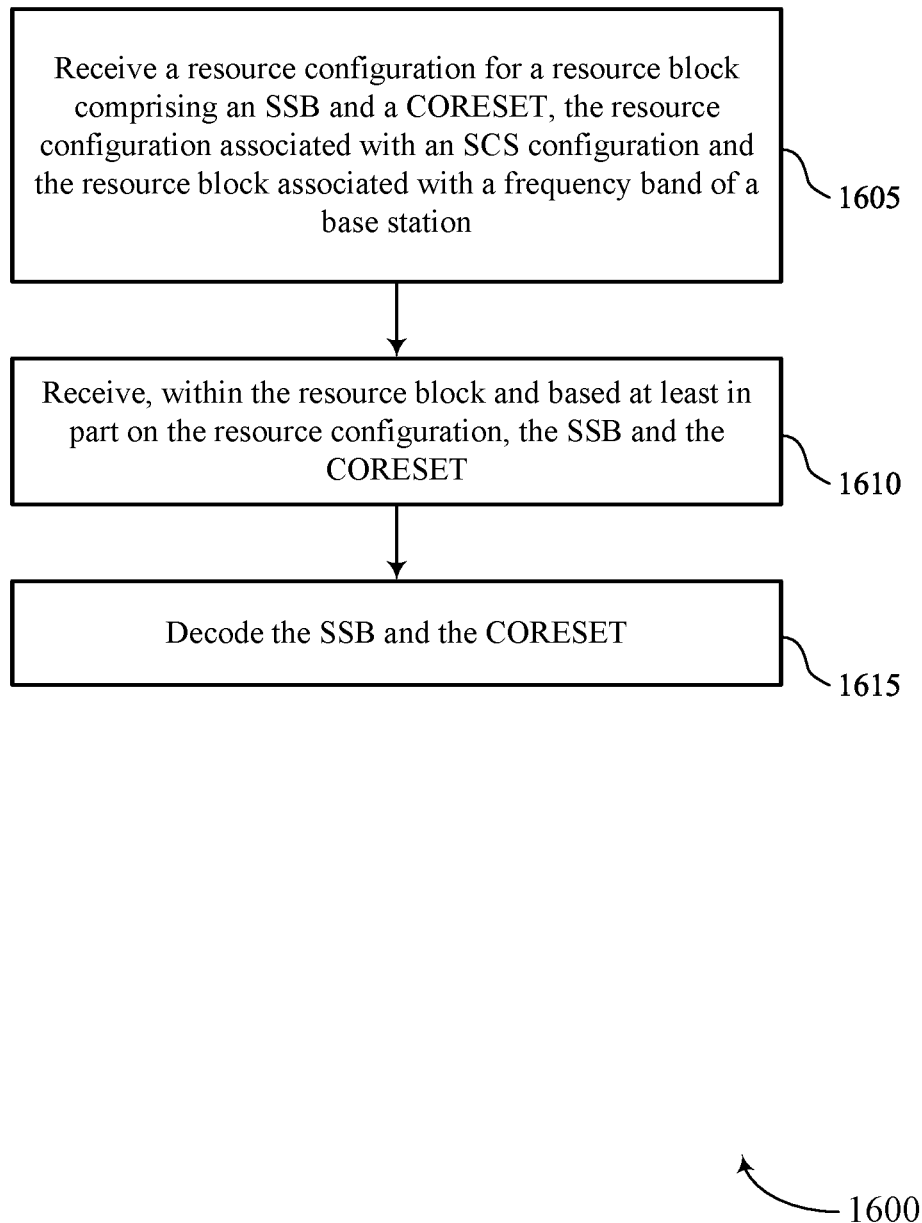
FIGS. 16 through 19 show flowcharts illustrating methods that support time domain SSB and CORESET multiplexing in accordance with one or more aspects of the present disclosure.

FIG. 16 shows a flowchart illustrating a method 1600 that supports time domain SSB and CORESET multiplexing in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving a resource configuration for a resource block including an SSB and a CORESET, the resource configuration associated with an SCS configuration and the resource block associated with a frequency band of a base station. The operations of 1605 may be performed in accordance with examples as disclosed herein. In some examples, aspects of the operations of 1605 may be performed by a resource component 1025 as described with reference to FIG. 10.

At 1610, the method may include receiving, within the resource block and based on the resource configuration, the SSB and the CORESET. The operations of 1610 may be performed in accordance with examples as disclosed herein. In some examples, aspects of the operations of 1610 may be performed by a resource block component 1030 as described with reference to FIG. 10.

At 1615, the method may include decoding the SSB and the CORESET. The operations of 1615 may be performed in accordance with examples as disclosed herein. In some examples, aspects of the operations of 1615 may be performed by an SSB and CORESET component 1035 as described with reference to FIG. 10.

Figure 17:
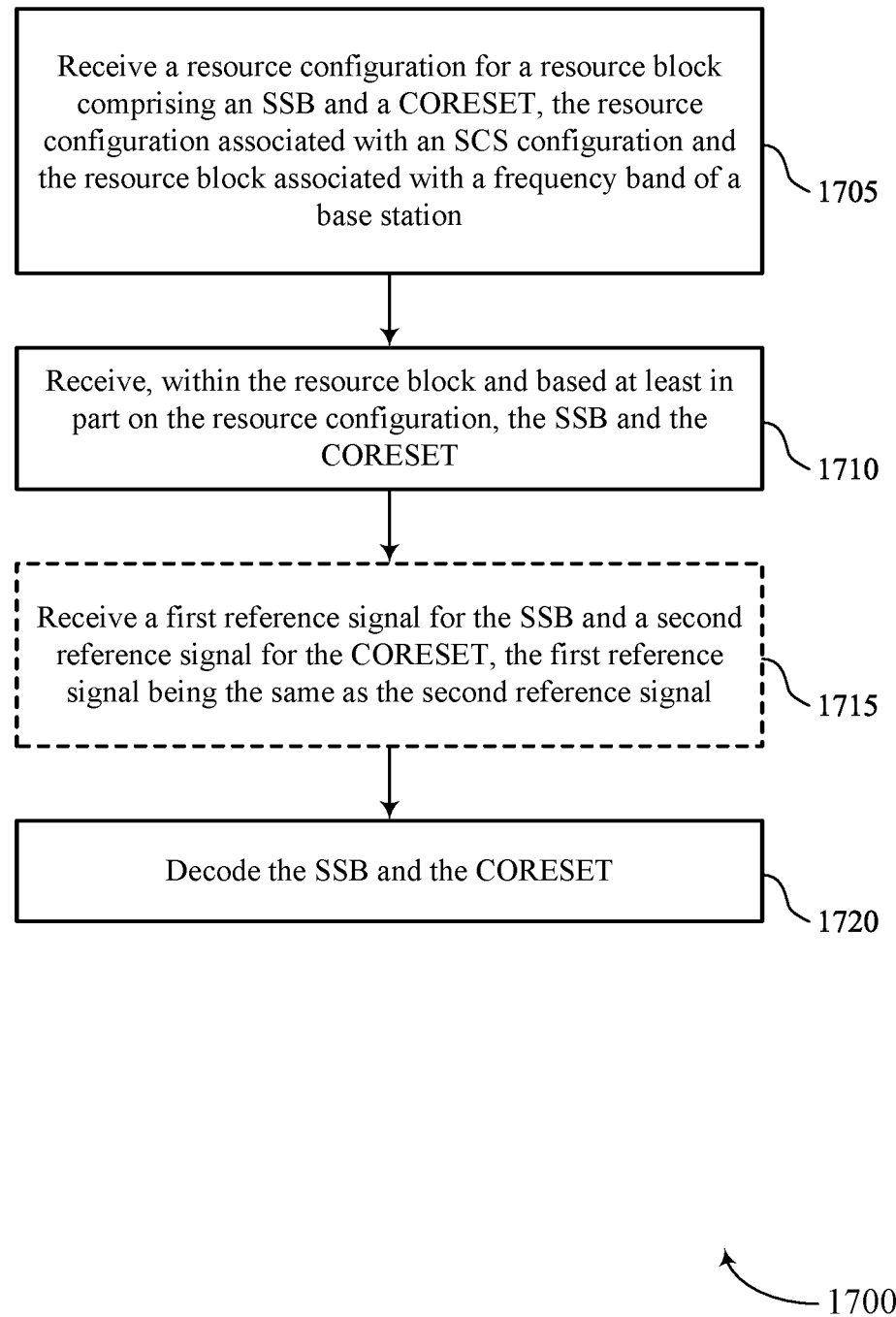

FIG. 17 shows a flowchart illustrating a method 1700 that supports time domain SSB and CORESET multiplexing in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving a resource configuration for a resource block including an SSB and a CORESET, the resource configuration associated with an SCS configuration and the resource block associated with a frequency band of a base station. The operations of 1705 may be performed in accordance with examples as disclosed herein. In some examples, aspects of the operations of 1705 may be performed by a resource component 1025 as described with reference to FIG. 10.

At 1710, the method may include receiving, within the resource block and based on the resource configuration, the SSB and the CORESET. The operations of 1710 may be performed in accordance with examples as disclosed herein. In some examples, aspects of the operations of 1710 may be performed by a resource block component 1030 as described with reference to FIG. 10.

At 1715, the method may include receiving a first reference signal for the SSB and a second reference signal for the CORESET, the first reference signal being the same as the second reference signal. The operations of 1715 may be performed in accordance with examples as disclosed herein. In some examples, aspects of the operations of 1715 may be performed by a reference signal component 1040 as described with reference to FIG. 10.

At 1720, the method may include decoding the SSB and the CORESET. The operations of 1720 may be performed in accordance with examples as disclosed herein. In some examples, aspects of the operations of 1720 may be performed by an SSB and CORESET component 1035 as described with reference to FIG. 10.

Figure 18:
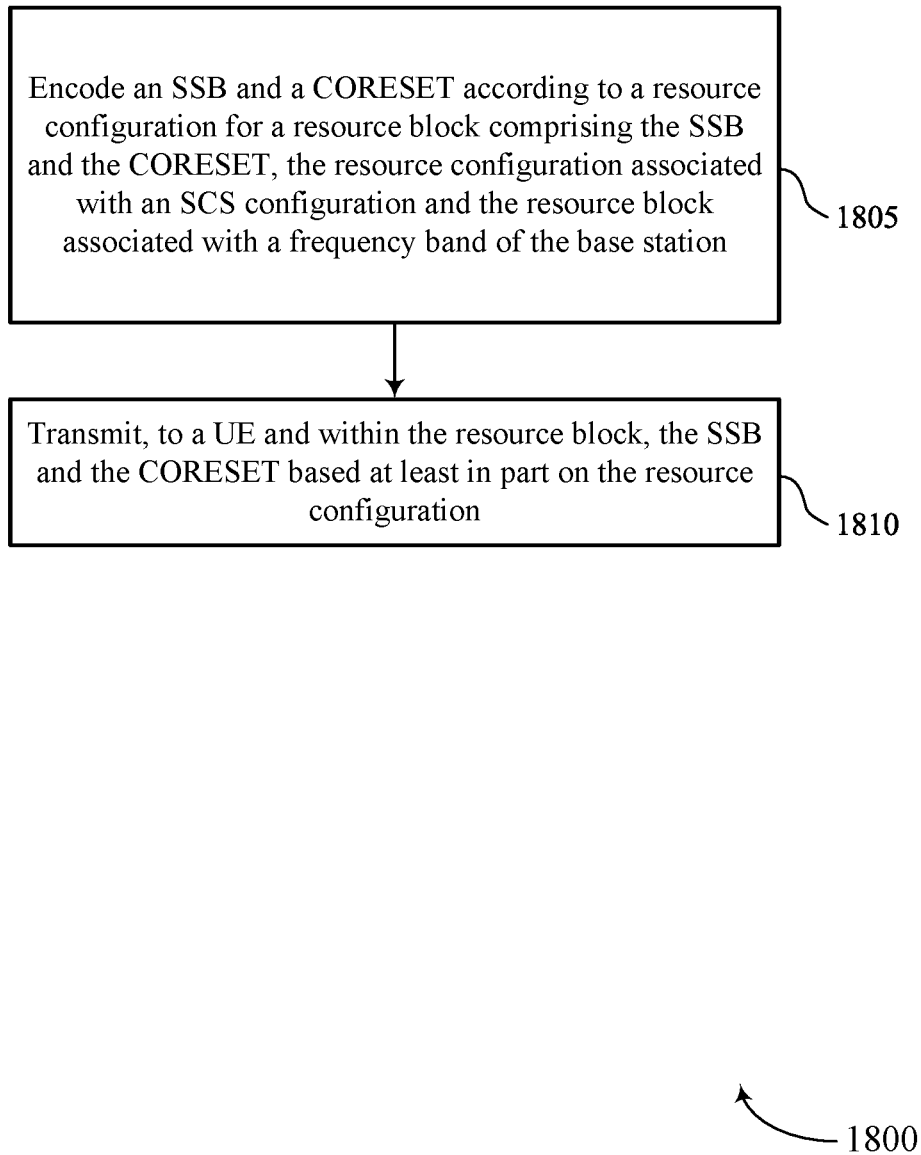

FIG. 18 shows a flowchart illustrating a method 1800 that supports time domain SSB and CORESET multiplexing in accordance with one or more aspects of the present disclosure. The operations of the method 1800 may be implemented by a base station or its components as described herein. For example, the operations of the method 1800 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1805, the method may include encoding an SSB and a CORESET according to a resource configuration for a resource block including the SSB and the CORESET, the resource configuration associated with an SCS configuration and the resource block associated with a frequency band of the base station. The operations of 1805 may be performed in accordance with examples as disclosed herein. In some examples, aspects of the operations of 1805 may be performed by a resource block component 1425 as described with reference to FIG. 14.

At 1810, the method may include transmitting, to a UE and within the resource block, the SSB and the CORESET based on the resource configuration. The operations of 1810 may be performed in accordance with examples as disclosed herein. In some examples, aspects of the operations of 1810 may be performed by an SSB and CORESET component 1430 as described with reference to FIG. 14.

Figure 19:
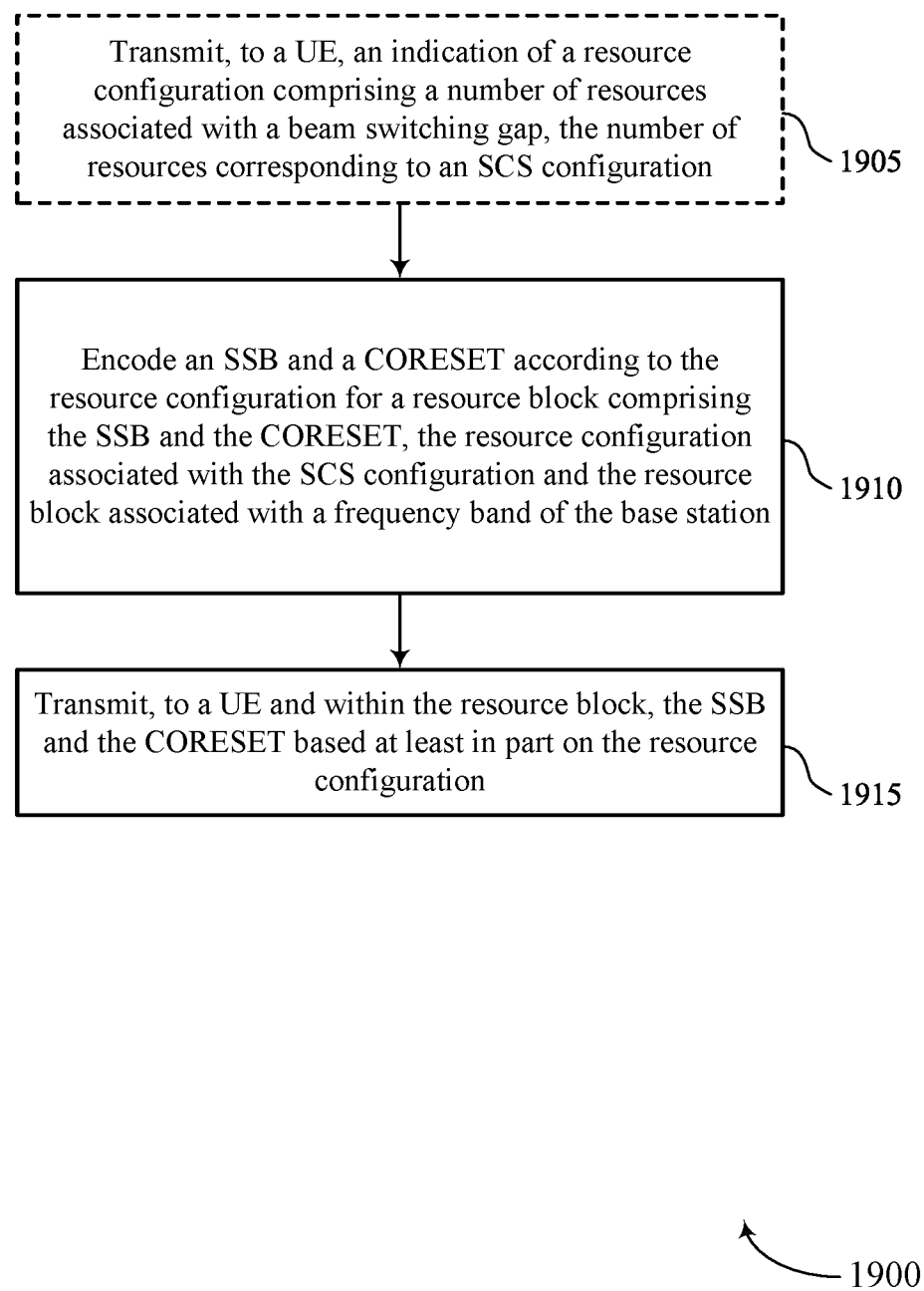

FIG. 19 shows a flowchart illustrating a method 1900 that supports time domain SSB and CORESET multiplexing in accordance with one or more aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, an indication of a resource configuration including a number of resources associated with a beam switching gap, the number of resources corresponding to an SCS configuration. The operations of 1905 may be performed in accordance with examples as disclosed herein. In some examples, aspects of the operations of 1905 may be performed by a resource component 1445 as described with reference to FIG. 14.

At 1910, the method may include encoding an SSB and a CORESET according to the resource configuration for a resource block including the SSB and the CORESET, the resource configuration associated with the SCS configuration and the resource block associated with a frequency band of the base station. The operations of 1910 may be performed in accordance with examples as disclosed herein. In some examples, aspects of the operations of 1910 may be performed by a resource block component 1425 as described with reference to FIG. 14.

At 1915, the method may include transmitting, to a UE and within the resource block, the SSB and the CORESET based on the resource configuration. The operations of 1915 may be performed in accordance with examples as disclosed herein. In some examples, aspects of the operations of 1915 may be performed by an SSB and CORESET component 1430 as described with reference to FIG. 14.

The following provides an overview of aspects of the present disclosure:

Aspect 1: A method for wireless communications at a UE, comprising: receiving a resource configuration for a resource block comprising a synchronization signal block and a control resource set, the resource configuration associated with a sub-carrier spacing configuration and the resource block associated with a frequency band of a base station; receiving, within the resource block and based at least in part on the resource configuration, the synchronization signal block and the control resource set; and decoding the synchronization signal block and the control resource set.

Aspect 2: The method of aspect 1, further comprising: receiving a first reference signal for the synchronization signal block and a second reference signal for the control resource set, the first reference signal being the same as the second reference signal.

Aspect 3: The method of aspect 2, wherein the synchronization signal block comprises a first bandwidth and the control resource set comprises a second bandwidth, the first bandwidth being the same as the second bandwidth.

Aspect 4: The method of any of aspects 1 through 3, further comprising: receiving a master information block comprising an indication of one or more frequency resources, a bandwidth, a time duration, or a combination thereof associated with the control resource set.

Aspect 5: The method of aspect 4, wherein the synchronization signal block comprises a first bandwidth and the control resource set comprises a second bandwidth, the first bandwidth being different from the second bandwidth.

Aspect 6: The method of any of aspects 1 through 5, the receiving the resource configuration comprising: receiving an indication of a number of resources associated with a beam switching gap, the number of resources corresponding to the sub-carrier spacing configuration; performing a beam switching operation during the number of resources based at least in part on decoding the synchronization signal block and the control resource set.

Aspect 7: The method of aspect 6, wherein the number of resources is zero, the method comprising performing the beam switching operation during a cyclic prefix associated with the synchronization signal block based at least in part on a size of the cyclic prefix satisfying a threshold value.

Aspect 8: The method of any of aspects 1 through 7, further comprising: selecting one of a first bandwidth or a second bandwidth for receiving a reference signal for the synchronization signal block and the control resource set based at least in part on the synchronization signal block corresponding to the first bandwidth and the control resource set corresponding to the second bandwidth.

Aspect 9: The method of aspect 8, the selecting comprising: selecting the first bandwidth based at least in part on the first bandwidth being greater than the second bandwidth.

Aspect 10: The method of any of aspects 8 through 9, further comprising: performing a channel estimation procedure to determine the first bandwidth and the second bandwidth, wherein the second bandwidth is a fixed bandwidth, the UE blindly selects the second bandwidth, the second bandwidth is indicated in a synchronization signal, the second bandwidth is a portion of bandwidth that overlaps with the synchronization signal block, or a combination thereof.

Aspect 11: The method of any of aspects 1 through 10, further comprising: performing a channel estimation procedure based at least in part on a first reference signal, the first reference signal different from a second reference signal associated with the synchronization signal block.

Aspect 12: The method of any of aspects 1 through 11, wherein the synchronization signal block is associated with a first waveform and the control resource set is associated with a second waveform, the first waveform being different from the second waveform.

Aspect 13: The method of any of aspects 1 through 11, wherein the synchronization signal block is associated with a first waveform and the control resource set is associated with a second waveform, the first waveform being the same as the second waveform.

Aspect 14: The method of any of aspects 1 through 13, wherein the synchronization signal block and the control resource set correspond to a broadcast channel.

Aspect 15: A method for wireless communications at a base station, comprising: encoding a synchronization signal block and a control resource set according to a resource configuration for a resource block comprising the synchronization signal block and the control resource set, the resource configuration associated with a sub-carrier spacing configuration and the resource block associated with a frequency band of the base station; and transmitting, to a UE and within the resource block, the synchronization signal block and the control resource set based at least in part on the resource configuration.

Aspect 16: The method of aspect 15, further comprising: transmitting a first reference signal for the synchronization signal block and a second reference signal for the control resource set, the first reference signal being the same as the second reference signal.

Aspect 17: The method of aspect 16, wherein the synchronization signal block comprises a first bandwidth and the control resource set comprises a second bandwidth, the first bandwidth being the same as the second bandwidth.

Aspect 18: The method of any of aspects 15 through 17, further comprising: transmitting a master information block comprising an indication of one or more frequency resources, a bandwidth, a time duration, or a combination thereof associated with the control resource set.

Aspect 19: The method of aspect 18, wherein the synchronization signal block comprises a first bandwidth and the control resource set comprises a second bandwidth, the first bandwidth being different from the second bandwidth.

Aspect 20: The method of any of aspects 15 through 19, further comprising: transmitting, to the UE, an indication of the resource configuration comprising a number of resources associated with a beam switching gap, the number of resources corresponding to the sub-carrier spacing configuration.

Aspect 21: The method of any of aspects 15 through 20, further comprising: transmitting, to the UE, a synchronization signal comprising an indication of a bandwidth for receiving a reference signal for the synchronization signal block and the control resource set.

Aspect 22: The method of any of aspects 15 through 21, further comprising: transmitting a reference signal for the synchronization signal block and the control resource set based at least in part on the synchronization signal block corresponding to a first bandwidth and the control resource set corresponding to a second bandwidth.

Aspect 23: The method of aspect 22, further comprising: transmitting, to the UE, a synchronization signal comprising an indication of the second bandwidth.

Aspect 24: The method of any of aspects 15 through 23, further comprising: transmitting, to the UE, a first reference signal and a second reference signal associated with the synchronization signal block.

Aspect 25: The method of any of aspects 15 through 24, wherein the synchronization signal block is associated with a first waveform and the control resource set is associated with a second waveform, the first waveform being different from the second waveform.

Aspect 26: The method of any of aspects 15 through 24, wherein the synchronization signal block is associated with a first waveform and the control resource set is associated with a second waveform, the first waveform being the same as the second waveform.

Aspect 27: The method of any of aspects 15 through 26, wherein the synchronization signal block and the control resource set correspond to a broadcast channel.

Aspect 28: An apparatus for wireless communications at a UE, comprising a processor and memory coupled with the processor, the processor and memory configured to perform a method of any of aspects 1 through 14.

Aspect 29: An apparatus for wireless communications at a UE, comprising at least one means for performing a method of any of aspects 1 through 14.

Aspect 30: A non-transitory computer-readable medium storing code for wireless communications at a UE, the code comprising instructions executable by a processor to perform a method of any of aspects 1 through 14.

Aspect 31: An apparatus for wireless communications at a base station, comprising a processor and memory coupled with the processor, the processor and memory configured to perform a method of any of aspects 15 through 27.

Aspect 32: An apparatus for wireless communications at a base station, comprising at least one means for performing a method of any of aspects 15 through 27.

Aspect 33: A non-transitory computer-readable medium storing code for wireless communications at a base station, the code comprising instructions executable by a processor to perform a method of any of aspects 15 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a resource configuration indicating a synchronization signal block and a control resource set are to be combined in a time domain into a resource block and indicating a quantity of symbols associated with a beam switching gap, the resource block associated with a frequency band and the beam switching gap associated with a beam switching operation for the synchronization signal block combined with the control resource set;
   receiving, in accordance with the resource configuration and within the resource block, the synchronization signal block and the control resource set combined in the time domain; and
   decoding the synchronization signal block and the control resource set.

2. The method of claim 1, further comprising:
   receiving a first reference signal for the synchronization signal block and a second reference signal for the control resource set, the first reference signal being the same as the second reference signal.

3. The method of claim 2, wherein the synchronization signal block comprises a first bandwidth and the control resource set comprises a second bandwidth, the first bandwidth being the same as the second bandwidth.

4. The method of claim 1, further comprising:
   receiving a master information block comprising an indication of one or more frequency resources, a bandwidth, a time duration, or a combination thereof associated with the control resource set.

5. The method of claim 4, wherein the synchronization signal block comprises a first bandwidth and the control resource set comprises a second bandwidth, the first bandwidth being different from the second bandwidth.

6. The method of claim 1, wherein the quantity of symbols is zero, the method comprising performing the beam switching operation during a cyclic prefix associated with the synchronization signal block based at least in part on a size of the cyclic prefix satisfying a threshold value.

7. The method of claim 1, further comprising:
   selecting one of a first bandwidth or a second bandwidth for receiving a reference signal for the synchronization signal block and the control resource set based at least in part on the synchronization signal block corresponding to the first bandwidth and the control resource set corresponding to the second bandwidth.

8. The method of claim 7, the selecting comprising:
   selecting the first bandwidth based at least in part on the first bandwidth being greater than the second bandwidth.

9. The method of claim 7, further comprising:
   performing a channel estimation procedure to determine at least one of the first bandwidth or the second bandwidth, wherein the second bandwidth is a fixed bandwidth, the UE blindly selects the second bandwidth, the second bandwidth is indicated in a synchronization signal, the second bandwidth is a portion of bandwidth that overlaps with the synchronization signal block, or a combination thereof.

10. The method of claim 1, further comprising:
    performing a channel estimation procedure based at least in part on a first reference signal, the first reference signal different from a second reference signal associated with the synchronization signal block.

11. The method of claim 1, wherein the synchronization signal block is associated with a first waveform and the control resource set is associated with a second waveform, the first waveform being different from the second waveform.

12. The method of claim 1, wherein the synchronization signal block is associated with a first waveform and the control resource set is associated with a second waveform, the first waveform being the same as the second waveform.

13. The method of claim 1, wherein the synchronization signal block and the control resource set correspond to a broadcast channel.

14. A method for wireless communications at a network device, comprising:
    encoding a synchronization signal block and a control resource set according to a resource configuration, the resource configuration indicating for the network device to combine the synchronization signal block and the control resource set in a time domain into a resource block and indicating a quantity of symbols associated with a beam switching gap, the resource block associated with a frequency band and the beam switching gap associated with a beam switching operation for the synchronization signal block combined with the control resource set; and
    transmitting, in accordance with the resource configuration and within the resource block, the synchronization signal block and the control resource set combined in the time domain.

15. The method of claim 14, further comprising:
    transmitting a first reference signal for the synchronization signal block and a second reference signal for the control resource set, the first reference signal being the same as the second reference signal.

16. The method of claim 15, wherein the synchronization signal block comprises a first bandwidth and the control resource set comprises a second bandwidth, the first bandwidth being the same as the second bandwidth.

17. The method of claim 14, further comprising:
    transmitting a master information block comprising an indication of one or more frequency resources, a bandwidth, a time duration, or a combination thereof associated with the control resource set.

18. The method of claim 17, wherein the synchronization signal block comprises a first bandwidth and the control resource set comprises a second bandwidth, the first bandwidth being different from the second bandwidth.

19. The method of claim 14, further comprising:
transmitting a synchronization signal comprising an indication of a bandwidth for receiving a reference signal for the synchronization signal block and the control resource set.

20. The method of claim 14, further comprising:
transmitting a reference signal for the synchronization signal block and the control resource set based at least in part on the synchronization signal block corresponding to a first bandwidth and the control resource set corresponding to a second bandwidth.

21. The method of claim 20, further comprising:
transmitting a synchronization signal comprising an indication of the second bandwidth.

22. The method of claim 14, further comprising:
transmitting a first reference signal and a second reference signal associated with the synchronization signal block.

23. The method of claim 14, wherein the synchronization signal block is associated with a first waveform and the control resource set is associated with a second waveform, the first waveform being different from the second waveform.

24. The method of claim 14, wherein the synchronization signal block is associated with a first waveform and the control resource set is associated with a second waveform, the first waveform being the same as the second waveform.

25. The method of claim 14, wherein the synchronization signal block and the control resource set correspond to a broadcast channel.

26. An apparatus for wireless communication at a user equipment (UE), comprising:
one or more memories; and
one or more processors coupled with the one or more memories and configured to cause the UE to:
receive a resource configuration indicating a synchronization signal block and a control resource set are to be combined in a time domain into a resource block and indicating a quantity of symbols associated with a beam switching gap, the resource block associated with a frequency band and the beam switching gap associated with a beam switching operation for the synchronization signal block combined with the control resource set;
receive, in accordance with the resource configuration and within the resource block, the synchronization signal block and the control resource set combined in the time domain; and
decode the synchronization signal block and the control resource set.

27. The apparatus of claim 26, wherein the one or more processors are further configured to cause the UE to:
receive a first reference signal for the synchronization signal block and a second reference signal for the control resource set, the first reference signal being the same as the second reference signal.

28. The apparatus of claim 26, wherein the one or more processors are further configured to cause the UE to:
receive a master information block comprising an indication of one or more frequency resources, a bandwidth, a time duration, or a combination thereof associated with the control resource set.

29. The apparatus of claim 26, wherein the quantity of symbols is zero, and wherein the one or more processors are further configured to cause the UE to:
perform the beam switching operation during a cyclic prefix associated with the synchronization signal block based at least in part on a size of the cyclic prefix satisfying a threshold value.

30. The apparatus of claim 26, wherein the one or more processors are further configured to cause the UE to:
select one of a first bandwidth or a second bandwidth for receiving a reference signal for the synchronization signal block and the control resource set based at least in part on the synchronization signal block corresponding to the first bandwidth and the control resource set corresponding to the second bandwidth.

31. The apparatus of claim 26, wherein the one or more processors are further configured to cause the UE to:
perform a channel estimation procedure based at least in part on a first reference signal, the first reference signal different from a second reference signal associated with the synchronization signal block.

32. An apparatus for wireless communication at a network device, comprising:
one or more memories; and
one or more processors coupled with the one or more memories and configured to cause the network device to:
encode a synchronization signal block and a control resource set according to a resource configuration, the resource configuration indicating for a network device to combine the synchronization signal block and the control resource set in a time domain into a resource block and indicating a quantity of symbols associated with a beam switching gap, the resource block associated with a frequency band and the beam switching gap associated with a beam switching operation for the synchronization signal block combined with the control resource set; and
transmit, in accordance with the resource configuration and within the resource block, the synchronization signal block and the control resource set combined in the time domain.

33. The apparatus of claim 32, wherein the one or more processors are further configured to cause the network device to:
receive a master information block comprising an indication of one or more frequency resources, a bandwidth, a time duration, or a combination thereof associated with the control resource set.

34. The apparatus of claim 32, wherein the one or more processors are further configured to cause the network device to:
transmit a first reference signal for the synchronization signal block and a second reference signal for the control resource set, the first reference signal is the same as the second reference signal.

35. The apparatus of claim 32, wherein the one or more processors are further configured to cause the network device to:
transmit a master information block comprising an indication of one or more frequency resources, a bandwidth, a time duration, or a combination thereof associated with the control resource set.

36. A non-transitory computer-readable medium storing code at a user equipment (UE), the code comprising instructions executable by one or more processors to cause the UE to:
    receive a resource configuration indicating that a synchronization signal block and a control resource set are to be combined in a time domain into a resource block and indicating a quantity of symbols associated with a beam switching gap, the resource block associated with a frequency band and the beam switching gap associated with a beam switching operation for the synchronization signal block combined with the control resource set;
    receive, in accordance with the resource configuration and within the resource block, the synchronization signal block and the control resource set that are combined in the time domain; and
    decode the synchronization signal block and the control resource set.

37. The non-transitory computer-readable medium of claim 36, wherein the instructions are further executable by the one or more processors to cause the UE to:
    receive a first reference signal for the synchronization signal block and a second reference signal for the control resource set, the first reference signal being the same as the second reference signal.

38. The non-transitory computer-readable medium of claim 36, wherein the instructions are further executable by the one or more processors to cause the UE to:
    receive a master information block comprising an indication of one or more frequency resources, a bandwidth, a time duration, or a combination thereof associated with the control resource set.

39. A non-transitory computer-readable medium storing code at a network device, the code comprising instructions executable by one or more processors to cause the network device to:
    encode a synchronization signal block and a control resource set according to a resource configuration, the resource configuration indicating for a network device to combine the synchronization signal block and the control resource set in a time domain into a resource block and indicating a quantity of symbols associated with a beam switching gap, the resource block associated with a frequency band and the beam switching gap associated with a beam switching operation for the synchronization signal block combined with the control resource set; and
    transmit, in accordance with the resource configuration and within the resource block, the synchronization signal block and the control resource set that are combined in the time domain.

40. The non-transitory computer-readable medium of claim 39, wherein the instructions are further executable by the one or more processors to cause the network device to:
    transmit a first reference signal for the synchronization signal block and a second reference signal for the control resource set, the first reference signal being the same as the second reference signal.

41. The non-transitory computer-readable medium of claim 39, wherein the instructions are further executable by the one or more processors to cause the network device to:
    transmit a master information block comprising an indication of one or more frequency resources, a bandwidth, a time duration, or a combination thereof associated with the control resource set.

42. The non-transitory computer-readable medium of claim 41, wherein the synchronization signal block comprises a first bandwidth and the control resource set comprises a second bandwidth, the first bandwidth being different from the second bandwidth.

43. The non-transitory computer-readable medium of claim 39, wherein the instructions are further executable by the one or more processors to cause the network device to:
    transmit an indication of the resource configuration comprising a number of resources associated with the beam switching gap, the number of resources corresponding to a sub- carrier spacing configuration.

\* \* \* \* \*